US006961092B1

(12) United States Patent
Kakiuchi et al.

(10) Patent No.: US 6,961,092 B1
(45) Date of Patent: Nov. 1, 2005

(54) THREE-DIMENSIONAL IMAGE CAPTURING DEVICE

(75) Inventors: Shinichi Kakiuchi, Saitama (JP); Shuzo Seo, Saitama (JP); Nobuhiro Tani, Tokyo (JP)

(73) Assignee: PENTAX Corporation, Tokyo (JP)

( * ) Notice: Subject to any disclaimer, the term of this patent is extended or adjusted under 35 U.S.C. 154(b) by 845 days.

(21) Appl. No.: 09/628,283

(22) Filed: Jul. 28, 2000

(30) Foreign Application Priority Data

| Jul. 30, 1999 | (JP) | ............................... P11-216449 |
| Jul. 30, 1999 | (JP) | ............................... P11-216987 |
| Jul. 30, 1999 | (JP) | ............................... P11-217061 |

(51) Int. Cl.[7] ............................................ H04N 5/222
(52) U.S. Cl. .................. 348/370; 348/135; 348/211.1; 348/258
(58) Field of Search ................................ 348/370, 258, 348/135, 211.1, 211.2; 356/3.01, 4.01

(56) References Cited

U.S. PATENT DOCUMENTS

| 4,686,572 | A | | 8/1987 | Takatsu |
| 4,831,453 | A | * | 5/1989 | Takemura .................... 348/296 |
| 5,005,085 | A | * | 4/1991 | Spies et al. .................. 348/311 |
| 5,148,211 | A | * | 9/1992 | Kotani et al. ................ 396/123 |
| 5,448,360 | A | * | 9/1995 | Wakai et al. ................. 356/601 |
| 5,570,220 | A | * | 10/1996 | Matsumoto et al. ........ 348/373 |
| 5,634,144 | A | * | 5/1997 | Mauro et al. ................. 396/57 |
| 5,648,817 | A | * | 7/1997 | Aoki et al. .................. 348/264 |
| 5,995,233 | A | * | 11/1999 | Ohtomo et al. ............. 356/400 |
| 6,023,292 | A | * | 2/2000 | Wakui ...................... 348/211.2 |
| 6,057,909 | A | | 5/2000 | Yahav et al. |
| 6,088,106 | A | * | 7/2000 | Rockseisen .................. 356/623 |
| 6,344,874 | B1 | * | 2/2002 | Helms et al. ................ 348/164 |
| 6,642,959 | B1 | * | 11/2003 | Arai .......................... 348/231.3 |

FOREIGN PATENT DOCUMENTS

| JP | 4-351074 | | 12/1992 | |
| JP | 09149315 | * | 6/1997 | .......... H04N 5/232 |

OTHER PUBLICATIONS

Christie et al., "Design and Development of a multi-detecting two-dimensional ranging sensor", Measurement Science and Technology, vol. 6, 1995, pp. 1301-1308.*
"Design and Development of a Multi-Detecting Two Dimensional Ranging Sensor", S. Christie et al., Measurement Science and Technology, vol. 6, 1995, pp. 1301-1308.

* cited by examiner

*Primary Examiner*—Tuan Ho
*Assistant Examiner*—Gevell Selby
(74) *Attorney, Agent, or Firm*—Greenblum & Bernstein, P.L.C.

(57) ABSTRACT

A three-dimensional image capturing device comprises a light emitting device and an imaging device, such as a CCD, having a plurality of photo-diodes, a vertical transfer unit and a substrate. A pulse-modulated distance measuring light beam is radiated from the light emitting device to a measurement subject and a reflected light beam, generated by the measurement subject due to the distance measuring light beam, is sensed by the photo-diodes, so that a distance information sensing operation which detects distance information of the measurement subject is executed. The data, for example, relating to the distance information or the image information of the measurement subject, which is stored in the device, is transmitted to an external computer system by an optical transmission system using the above light emitting device. A data transmitting light beam may be superposed onto the distance measuring light beam.

17 Claims, 27 Drawing Sheets ized light weight handy three-dimensional image capturing device by which data can be efficiently transmitted to a device externally provided, such as a computer system, without connecting any type of cable between the devices.

THREE-DIMENSIONAL IMAGE CAPTURING DEVICE

BACKGROUND OF THE INVENTION

1. Field of the Invention

The present invention relates to a three-dimensional image capturing device by which a three-dimensional shape of a measurement subject, which is to be measured, is captured by a time-of-flight measurement.

2. Description of the Related Art

To perform a three-dimensional image processing for a three-dimensional image comprised of an image data and three-dimensional data of a measurement subject, such data being obtained by an image information sensing operation and a distance information sensing operation of a three-dimensional image capturing device, a high image processing ability and a large storage capacity are required for the three-dimensional image capturing device. However, as the three-dimensional image capturing device is miniaturized, it is quite difficult to provide additional electric circuits and devices so as to obtain the above capability. Therefore, a conventional three-dimensional image capturing device is generally connected to a computer system, which is externally disposed, by an interface cable, for example, and detected data is transmitted via the cable, so that the three-dimensional image processing may be executed for the data.

In order to obtain a three-dimensional image of the whole or arbitrary part of a measurement subject, a data composing operation to compose a plurality of image data and three-dimensional data, which is obtained by the sensing operations from various directions, is necessary. However, if the three-dimensional image capturing device is connected to the computer with the cable, a range of locations, in which the three-dimensional image capturing device can be operated, is limited, so that the sensing operations from various directions are difficult. Further, the cable also becomes an obstacle to the sensing operation and encumbers the handling of the device.

SUMMARY OF THE INVENTION

An object of the present invention is to provide a miniaturized light weight handy three-dimensional image capturing device by which data can be efficiently transmitted to a device externally provided, such as a computer system, without connecting any type of cable between the devices.

According to the present invention, there is provided a three-dimensional image capturing device, comprising a first and second light source, an image device and a distance information sensing processor.

The first and second light source radiates a light beam and the image device accumulates signal charge corresponding to a quantity of light received on the image device. The distance information sensing processor radiates a distance measuring light beam from the first light source to a measurement subject and detects distance information that relates to the measurement subject by receiving a reflected light beam from the measurement subject due to the distance measuring light beam on the image device. The data transmitting processor controls radiation at the second light source and radiates transmitting light beams, so that data is transmitted to an external device through space.

Preferably, the second light source is identical to the first light source. The pulse frequency-modulation bands of the distance measuring light beam and the transmitting light beam are different from each other, and the data comprises said distance information. Further, the device comprises an image sensing processor that detects image information of the measurement subject by forming an image of the measurement subject on the image device and the data comprises the image information. Furthermore, it may comprise a switching processor that switches on and off the drive of said transmitting processor.

Preferably, a series of the distance measuring light beams and a series of the transmitting light beams are further superposed. In this case, the distance information sensing processor may radiate the distance measuring light beams from the first light source a predetermined number of times, so that signal charge is accumulated in the image device for each reiterated radiation. The timing for radiating the transmitting light beams is based upon the timing of the reiterated radiation of the distance measuring light beams.

In a preferable example, the series of the distance measuring light beams and the series of the transmitting light beams are superposed, so that the transmitting light beams are radiated in the intervals between the distance measuring light beams, and the transmitting light beams comprise a pulse beam that represents binary data in predetermined digits. Further, the distance measuring light beams and the transmitting light beams are superposed by pulse-width modulation of the light beams, so that the light beams comprise two types of pulse beams having different widths, which represent the binary data and are concurrently used for detecting the distance information. Furthermore, the distance measuring light beams may comprise a synchronizing signal of an optical transmission system.

In another preferable example of the present invention, an accumulation of the signal charge in the image device is synchronously carried out with the transmitting light beam, so that that transmitting light beam can be used as the distance measuring light beam as well, and by this, the transmitting light beams and the distance measuring light beams are superposed with each other. The data sequence transmitted by the transmitting light beams may comprise a partition signal that delimits the data sequence by predetermined binary digits of the data.

The image device preferably comprises a plurality of photoelectric conversion elements that accumulates signal charge corresponding to a quantity of light received, and signal charge holding units disposed adjacent to each of the photoelectric conversion elements. The accumulation of the signal charge in the image device begins with a fall of an electric charge discharging signal that discharges the charge accumulated in the photoelectric conversion elements, and ends with a fall of an electric charge transfer signal that transfers the signal charge accumulated in the photoelectric conversion elements to the signal charge holding units. The electric charge transfer signal rises approximately simultaneously with the fall of the electric charge discharging signal.

Further, the electric charge transfer signal may be generated by conjunction of a standard electric charge transfer signal comprised of periodic pulse signals and a data synchronizing pulse signal generated synchronously with the fall of a pulse signal of the data sequence. Also, the electric charge discharging signal may be generated by conjunction of the data synchronizing pulse signal and a standard electric charge discharging signal, a period of which is the same as the standard electric charge transfer signal and from which the phase is delayed by a half period. The data synchronizing pulse signal may also be synchronized with the standard electric charge discharging signal and the pulse width of the data synchronizing pulse signal is the same as one period of the standard electric charge transfer signal.

Furthermore, there is a distance measuring period, in which the distance measuring light beams are repeatedly radiated the predetermined number of times, and it may comprise a data transmitting period and a supplement light emitting period. In the data transmitting period, the distance measuring light beams and the transmitting light beams are superposed and radiated. On the other hand, in the supplement light emitting period, the distance measuring light beams are radiated so as to supplement the number of the distance measuring light beams radiated in the data transmitting period, by the number deficient from the predetermined number of times.

Further, according to the present invention, there is also provided a receiver for use in an optical transmission system, a transmitter of which comprises a three-dimensional image capturing device, comprising a first and second light source, an image device that accumulates signal charge, a distance information sensing processor and a data transmitting processor.

The first and second light source radiates a light beam and the image device accumulates signal charge corresponding to a quantity of light received on the image device. The distance information sensing processor radiates a distance measuring light beam from the first light source to a measurement subject and detects distance information which relates to the measurement subject by receiving a reflected light beam from the measurement subject due to the distance measuring light beam on the image device. The data transmitting processor controls radiation at the second light source and radiates transmitting light beams, so that data is transmitted to the receiver of an external device through space. The external device starts a receiving operation of the data when the receiver receives the distance measuring light beam.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
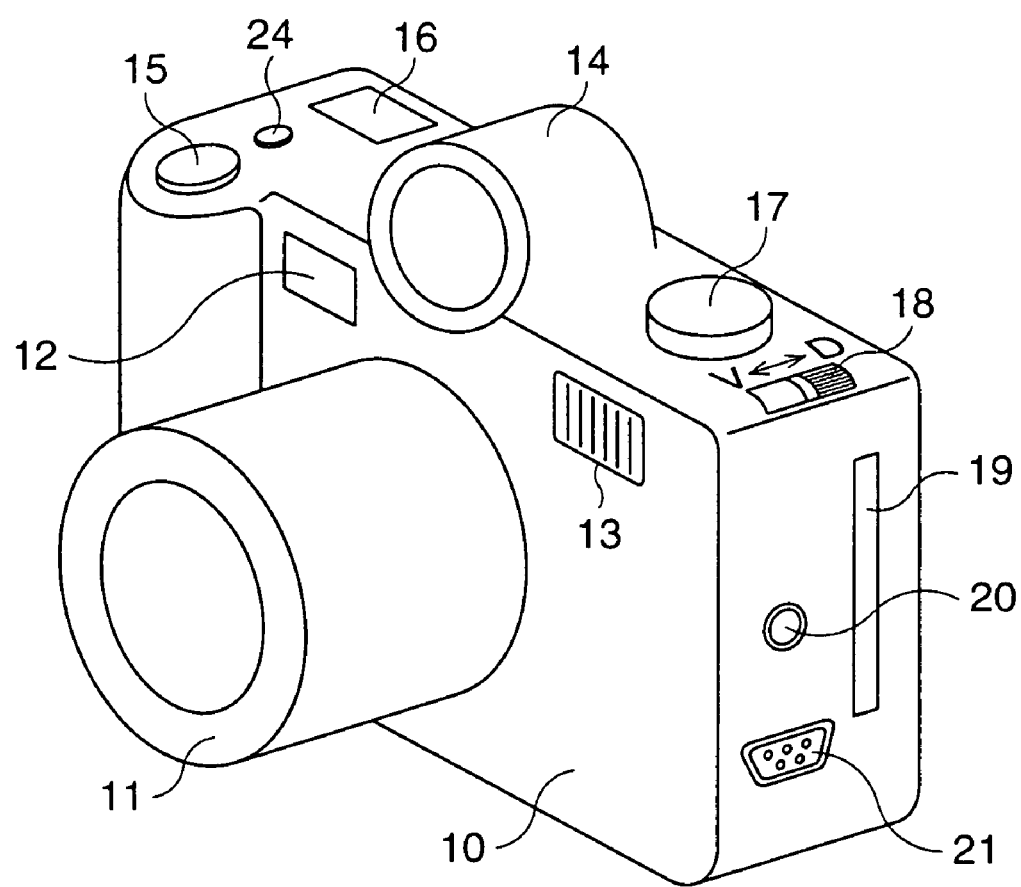
FIG. 1 is a perspective view showing a camera provided with a three-dimensional image capturing device of a first embodiment of the present invention.

The present invention is described below with reference to embodiments shown in the drawings.

FIG. 1 is an external view of a camera type optical reader (three-dimensional image capturing device) of a first embodiment of the present invention.

On a front surface of a camera body 10, a view-finder window 12 is provided toward a left-upper edge, adjacent to a photographing lens 11, and an electronic flash 13 is disposed toward a right-upper edge. On an upper surface of the camera body 10, a light emitting device (i.e., a light source) 14, which radiates a laser beam (an infrared laser beam, for example, being a distance measuring light beam) is mounted above the photographing lens 11. A release switch 15, a data transmitting mode button 24 and a liquid crystal display panel 16 are provided on a left side of the light emitting device 14, and a mode change dial 17 and a V/D mode switch 18 are provided on a right side of the device 14. On a side surface of the camera body 10, a card slot 19 is formed, into which a recording medium, such as an IC memory card, is insertable, and a video output terminal 20 and an interface connector 21 are also provided.

Figure 2:
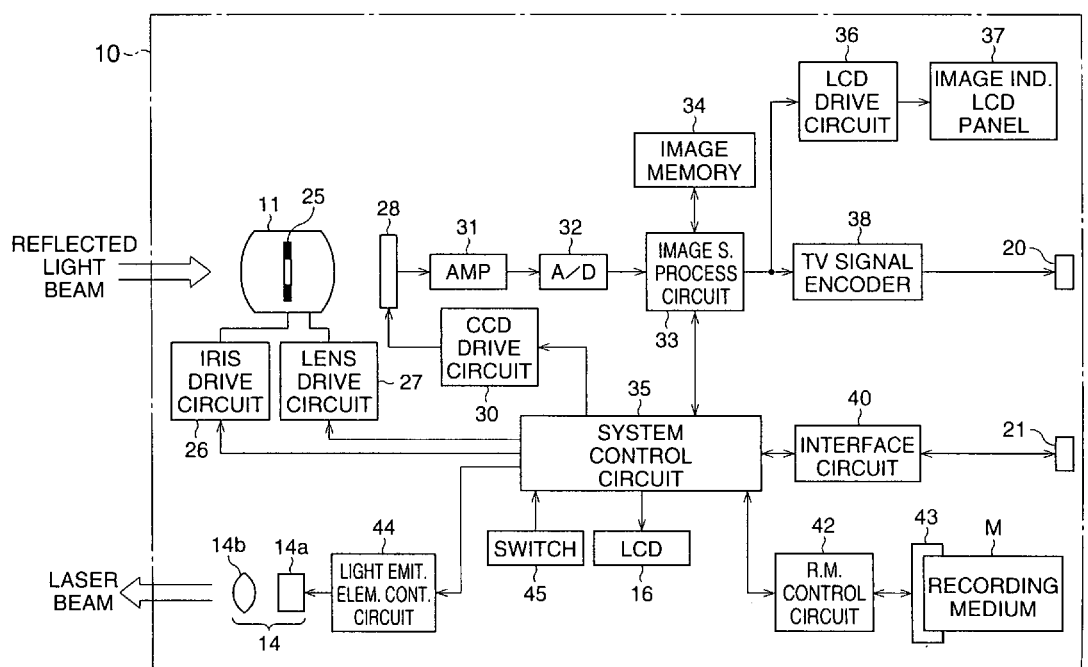
FIG. 2 is a block diagram showing an electrical construction of the camera of the first embodiment.

FIG. 2 is a block diagram showing an electrical construction of the camera of FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device (not shown), provided externally to the camera body 10, through a video output terminal (not shown), if necessary. The system control circuit 35 is connected to an interface circuit 40, which in turn is connected to an interface connector 21. Therefore, if there is a need, the digital image data read from the image memory 34 can also be transmitted to a computer (not shown) connected to the interface connector 21 by an interface cable. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43. Note that the camera need not be connected to the computer with the interface cable. Namely, the image data can also be transmitted by the optical transmitting system described later. Further, the video output terminal is not essential.

A light emitting element control circuit 44 is connected to the system control circuit 35. The light emitting device 14 is provided with a light emitting element (laser diode (LD)) 14a and an illumination lens 14b, and an operation of the light emitting element 14a is controlled by the light emitting element control circuit 44. The light emitting element 14a radiates a laser beam, which is a distance measuring light beam or a data transmitting light beam. In a distance information sensing operation, the laser beam irradiates a whole of a measurement subject through the illumination lens 14b, and in a data transmitting operation, the laser beam irradiates an area comprising a receiver of an optical transmitting system connected with the computer. In distance information sensing operation, the laser beam, reflected by the measurement subject, becomes incident on the photographing lens 11. By detecting the reflected laser beam with the CCD 28 provided with a plurality of photo-diodes, which are two-dimensionally disposed on a surface thereof, three-dimensional distance information is sensed as image data (three-dimensional image data), which is described later. The data, which is sensed by the CCD 28, is transmitted to a computer system by the optical transmitting system, which is executed with a light emitting operation of the light emitting element 14a. Note that in the above operations, a timing of signal charge transferring operations in the CCD 28 is controlled by the system control circuit 35 and the CCD drive circuit 30.

The liquid crystal display panel 16 and a switch group 45, including the release switch 15, the mode change dial 17, the V/D mode switch 18 and the data transmitting mode button 24, are connected to the system control circuit 35.

Figure 3:
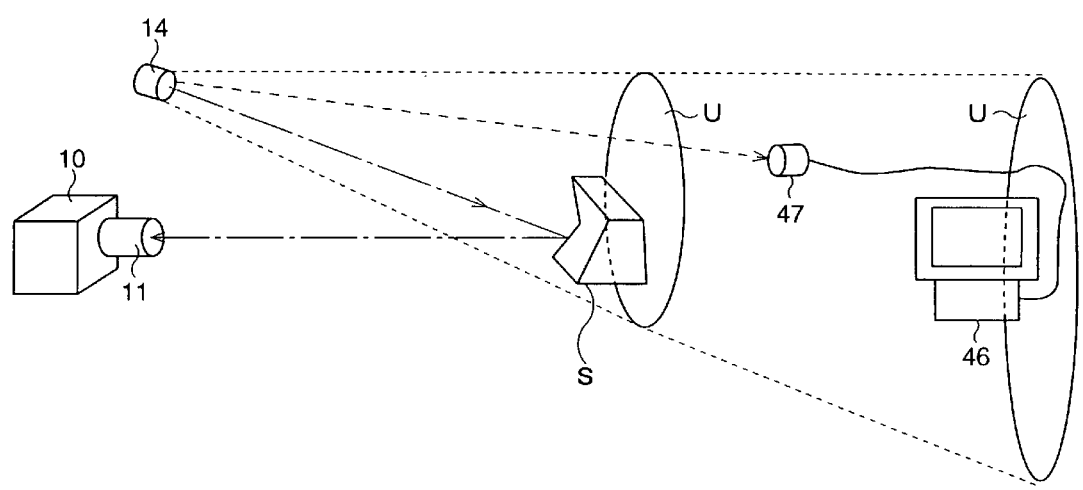
FIG. 3 illustrates an arrangement of the camera, the measurement subject and the computer system, when the data transmitting operation is executed.

FIG. 3 schematically illustrates a disposition of the camera body 10, the light emitting device 14, the receiver 47, the computer system 46 and the measurement subject S, wherein the distance information sensing operation, which detects the distance information relating to the distances from the camera body to each point on the surface of the measurement subject, and the data transmitting operation, which transmits the distance data and/or image data from the camera to the externally disposed device, such as the computer system 46 for example, are carried out.

The distance information sensing operation is carried out by radiating the distance measuring light beam from the light emitting device 14 to the measurement subject S, and receiving the reflected light beam, which is reflected by the measurement subject S and incident through the photographing lens 11, on the CCD 28. On the other hand, the data transmitting operation is carried out by receiving and detecting the data transmitting light beam with the receiver 47 disposed within the illuminating area U of the data transmitting light beam radiated from the light emitting device 14. The data transmitting light beam detected by the receiver 47 is converted to electric signal and transferred to the computer system 46 as received data. Then a predetermined image processing is performed to the received data and a three-dimensional image of the measurement subject is displayed on the monitor. Note that the distance measuring light beam and the data transmitting light beam, radiated from the light emitting device 14, are pulse modulated laser beams. Further, a frequency-modulated band of data transmitting light beam is ten times higher than that of the distance measuring light beam, for example. Thus, each of the light beams is easily discriminated at the receiver 47, since each of the frequency-modulated bands is dissimilar from each other.

Figure 4:
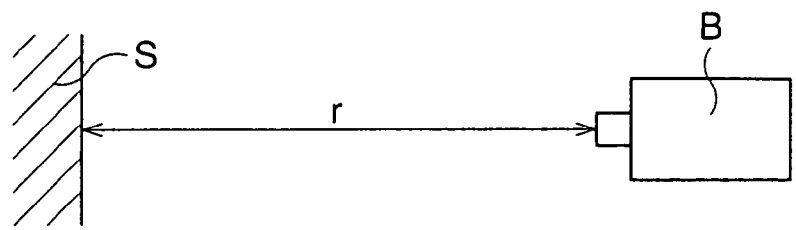
FIG. 4 is a view showing a principle behind a distance measurement.
Figure 5:
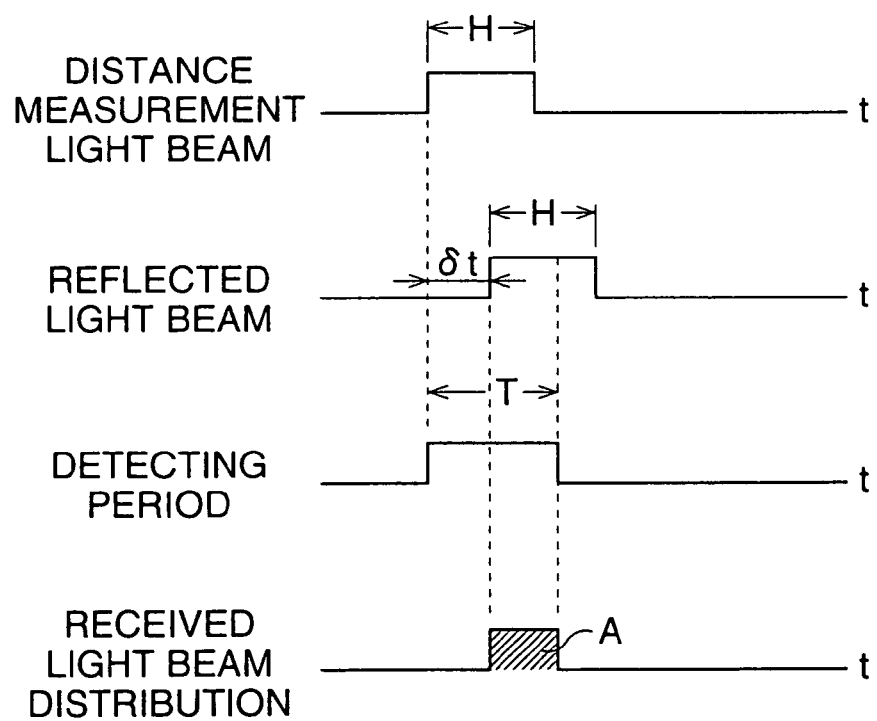
FIG. 5 is a timing chart showing a distance measurement light beam, a reflected light beam, a gate pulse and a distribution of an amount of a light beam received by a CCD.

With reference to FIGS. 4 and 5, a principle behind a distance measurement in the embodiment is described below. Note, in FIG. 5, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similarly to the distance measuring light beam. Therefore, a rise of the pulse of the reflected light beam occurs after a rise of the pulse of the distance measuring light beam by a time δ·t (δ is a delay coefficient). Since the distance measuring light beam and the reflected light beam have both traveled a distance "r" between the distance measurement device B and the measured subject S, the distance "r" is represented as follows:

$$r = \delta \cdot t \cdot C / 2 \qquad (1)$$

wherein "C" is the speed of light.

For example, by setting a condition in such a manner that the reflected light beam can only be sensed from a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the less the received light amount A.

In the embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data relating to the three-dimensional image, which indicates the topography of the measurement subject S, can be obtained.

Figure 6:
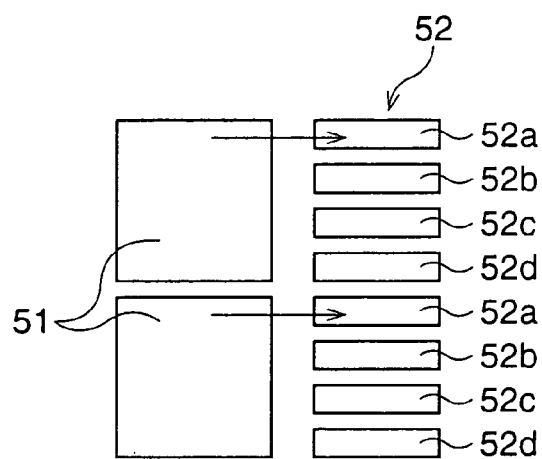
FIG. 6 is a plan view showing a disposition of photodiodes and a vertical transfer unit, which are provided in the CCD of the first embodiment.
Figure 7:
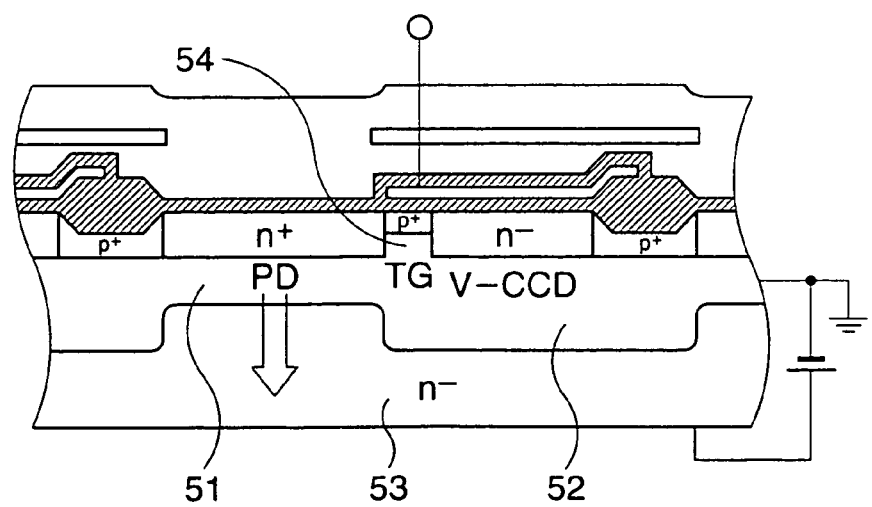
FIG. 7 is a sectioned elevational view of the CCD.

FIG. 6 is a plan view showing a disposition of the photo-diodes 51 and a vertical transfer unit 52, which are provided in the CCD 28. Actually, a multitude of photo-diodes 51 are arranged in a matrix, and a corresponding vertical transfer unit 52 is disposed beside each vertical column of photo-diodes 51. FIG. 7 is a sectioned elevational view of the CCD 28 in which the CCD 28 is cut by a plane perpendicular to a substrate 53. The CCD 28 is an interline CCD of vertical overflow drain (VOD) type, in which unwanted charge is discharged to the substrate 53.

The photo-diodes 51 and the vertical transfer unit (signal charge holding unit) 52 are formed along a surface of the n-type substrate 53. A plurality of the photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well known. Note that a number of the vertical transfer electrodes can be changed, depending upon the requirement of the CCD 28.

The photo-diodes (PD) 51 and the vertical transfer unit (V-CCD being signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and an amount of the electric charge corresponds to an amount of an incident light beam, which is the reflected light beam reflected by the measurement subject. When a substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diode 51 is transferred to the vertical transfer unit 52 by the electric charge transfer signal. By repeating the discharge and the transfer, an electronic shuttering operation is performed.

Figure 8:
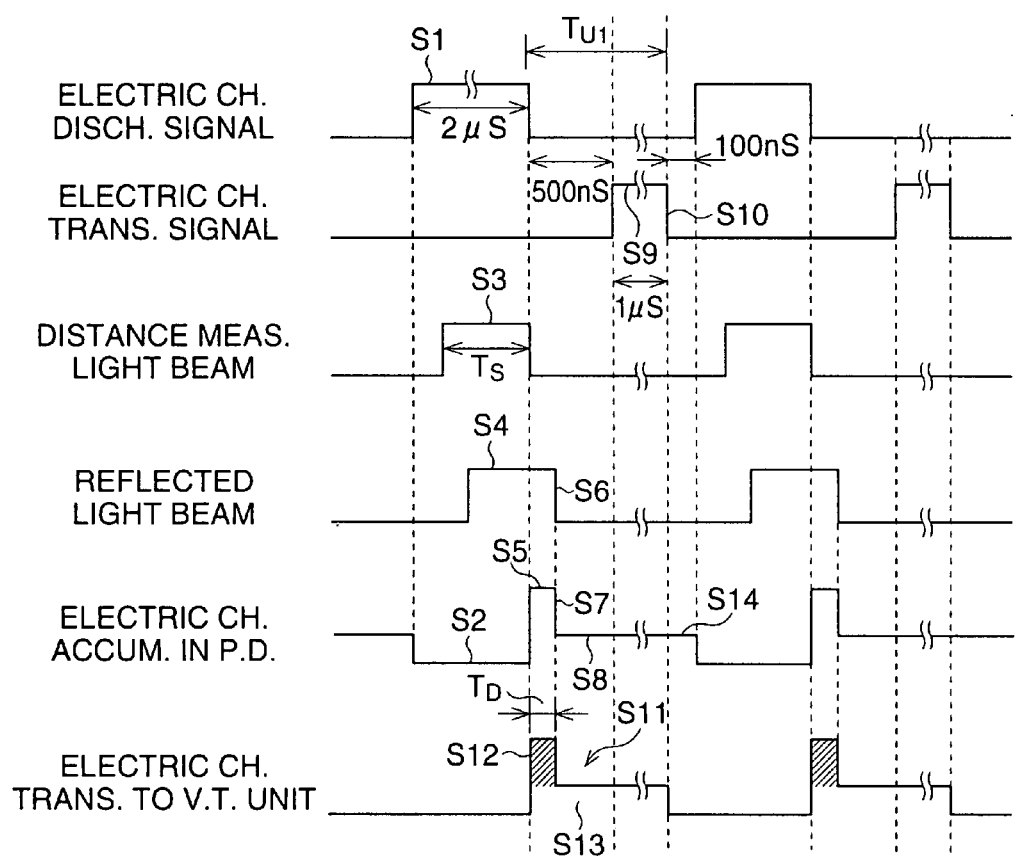
FIG. 8 is a timing chart of a distance information sensing operation by which data, corresponding to a distance from a camera body to each point on a surface of the measurement subject, is sensed in the first embodiment.

FIG. 8 is a timing chart of a distance information sensing operation by which data, corresponding to the distance from the camera body 10 to each point on a surface of the measurement subject, is sensed. The distance information sensing operation is described below with reference to FIGS. 1, 2, 6, 7 and 8. Note that the timing chart of the distance information sensing operation in the present embodiment is slightly different from the timing chart of the distance measurement principle, which was described above with reference to FIG. 5. Namely, the timing chart of the present embodiment is set so as to sense the reflected light beam from a point subsequent to the rise of the reflected light beam pulse to a point subsequent to the fall. By this manner, a noise component due to an ambient daylight may be reduced, though the principles of the above distance measurement means are basically the same.

In synchronization with an output of a vertical synchronizing signal (not shown), an electric charge discharging signal (a pulse signal) S1 is output, so that unwanted charge, which is accumulated in the photo-diodes 51, is discharged to the substrate 53. The electric charge value, while the pulse signal S1 is output, is indicated as S2 in the chart. After the electric charge discharging signal S1 is output, the light emitting device 14 is actuated, and thus a distance measuring light beam S3, which is a pulsed beam having a constant width $T_S$, is output therefrom. A period for outputting the distance measuring light beam S3 or the width of the pulse beam is modulated according to a requirement. In the present embodiment, the distance measuring light beam S3 is modulated as to be completed approximately simultaneously with a completion of the output of the electric charge discharging signal S1.

The distance measuring light beam S3 is reflected by the measurement subject, and enters the CCD 28 as a reflected light beam S4. When the output of the electric charge discharging signal S1 ends, the electric charge for incident light, which comprises the reflected light beam S4 and an ambient daylight, starts on each of the photo-diodes and a signal charge S5 is sensed. When an incident of the reflected light beam S4 is completed, i.e. after the fall indicated with a reference sign S6, the photo-diodes only generate signal charge S8 due to the ambient daylight.

An electric charge transfer signal (pulse signal) S9 is output only to the vertical transfer electrodes 52a, and an electric charge accumulated in the photo-diodes 51 are transferred to the vertical transfer unit 52. The operation of transferring the accumulated electric charge in the photo-diodes 51 ends with the fall S10, which is a termination of the output of the electric charge transfer signal S9. Namely, a signal charge S11 of which electric signal accumulation was started just after the completion of the electric charge discharging signal output and terminated just after the completion of the output of the electric transfer signal S9, is transferred to the vertical transfer unit 52, while the photo-diodes continue to accumulate electric signals S14 due to the ambient daylight.

Thus during a period $T_{U1}$ from the end of the output of the electric charge discharging signal S1 to the end of the output of the electric charge transfer signal S9, a signal charge S11, corresponding to distances from the camera body 10 to the measurement subject and the ambient daylight is accumulated in the photo-diodes 51. Namely, the signal charge S12, a hatched portion of signal charge S11, corresponds to the distances from the camera body 10 to the measurement subject, while a residual portion S13 of the signal charge S11 results from the ambient daylight.

When a predetermined time has elapsed since the output of the electric charge transfer signal S9, a subsequent electric charge discharge signal is output, so that the signal charge S14, an electric charge accumulated in the photo-diodes after the signal charge transfer to the vertical transfer unit 52, is discharged to the substrate 53. Subsequently, another signal charge is accumulated in the photo-diodes 51. Then, similarly to the above description, when the electric charge accumulation period $T_{U1}$ has again elapsed, the signal charge S11 is transferred to the vertical transfer unit 52.

The transferring operation of the signal charge S11 to the vertical transfer unit 52 is repeatedly performed until the next vertical synchronizing signal (not shown) is output. Thus, the signal charge S11 is integrated in the vertical transfer unit 52. The signal charge S11 integrated for one field period, which is between two vertical synchronizing signals, corresponds to distance information of the measurement subject, on condition that the measurement subject is stationary for the period between the two vertical synchronizing signals.

The detecting operation of the signal charge S11 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown). The distance information is then output from the CCD 28.

The reflected light beam detected by the CCD 28 is affected by the reflectance of the surface of the subject. Therefore, the distance information obtained through the reflected light beam contains error derived from the reflectance. Further, the light beam sensed by the CCD 28 may contain an extra component, such as ambient daylight, being other than the reflected light beam from the measurement subject, which can cause an error. A description for methods of correcting such errors are given in the following, as a part of a flowchart showing the distance information sensing operation and data transmitting operation.

Figure 9:
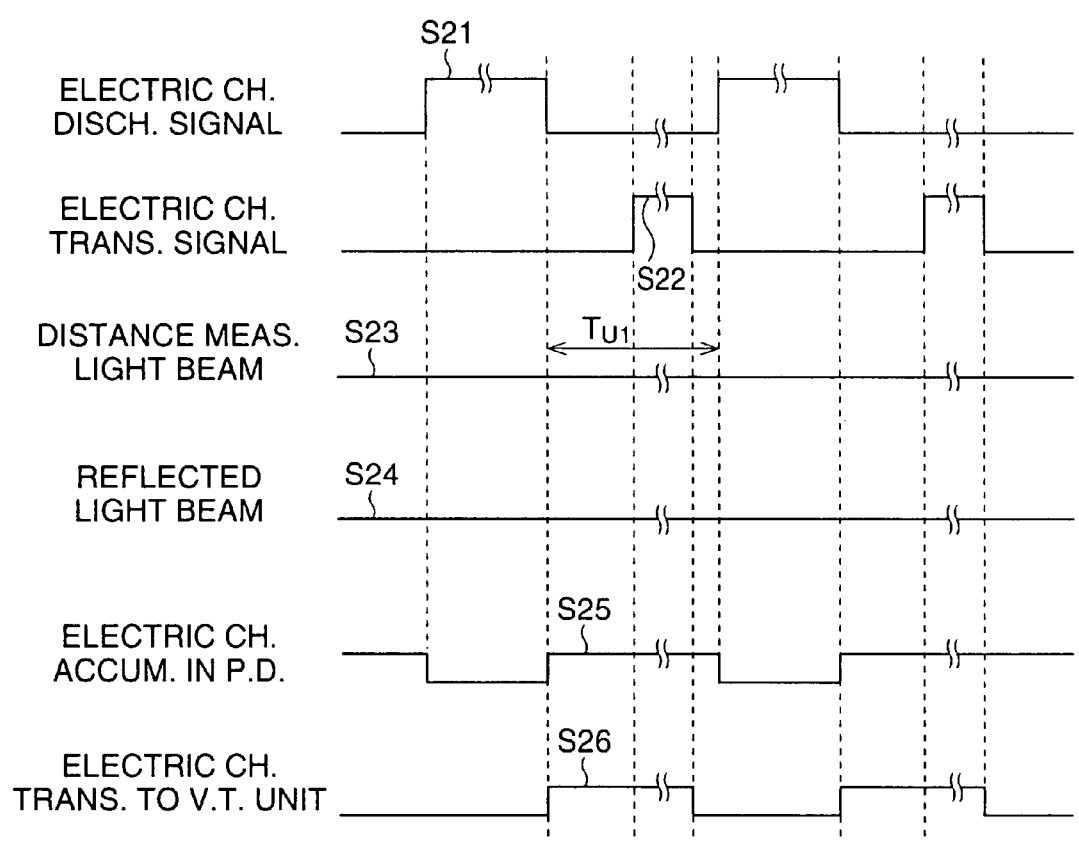
FIG. 9 is a timing chart of a distance correction information sensing operation in the first embodiment.
Figure 10:
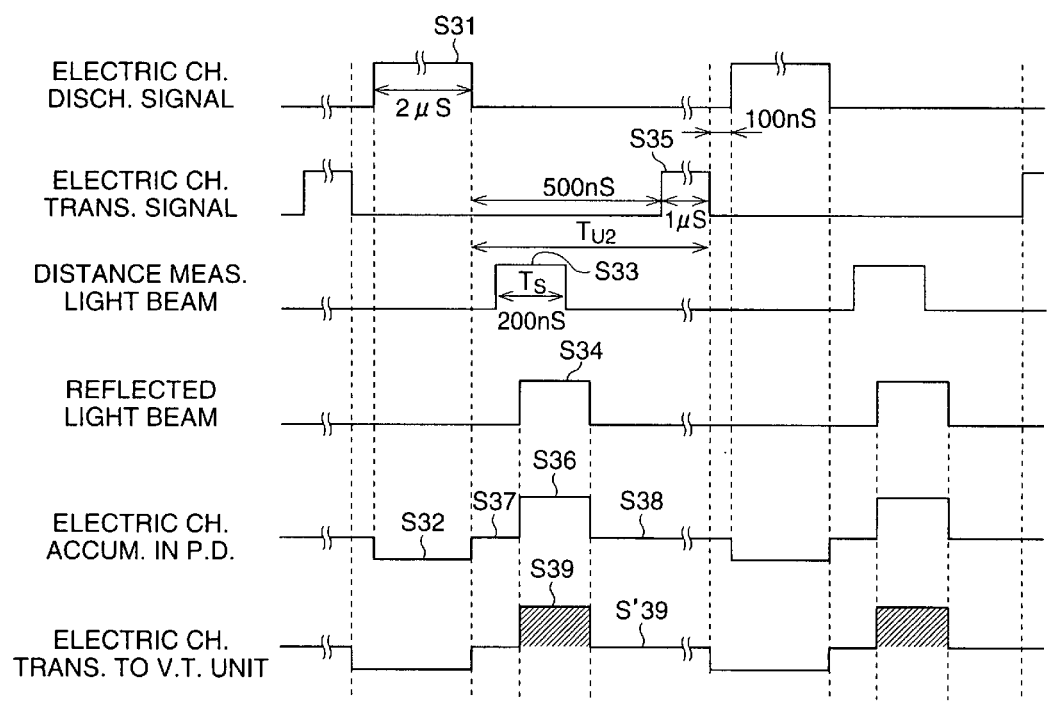
FIG. 10 is a timing chart of a reflectance information sensing operation in the first embodiment.
Figure 11:
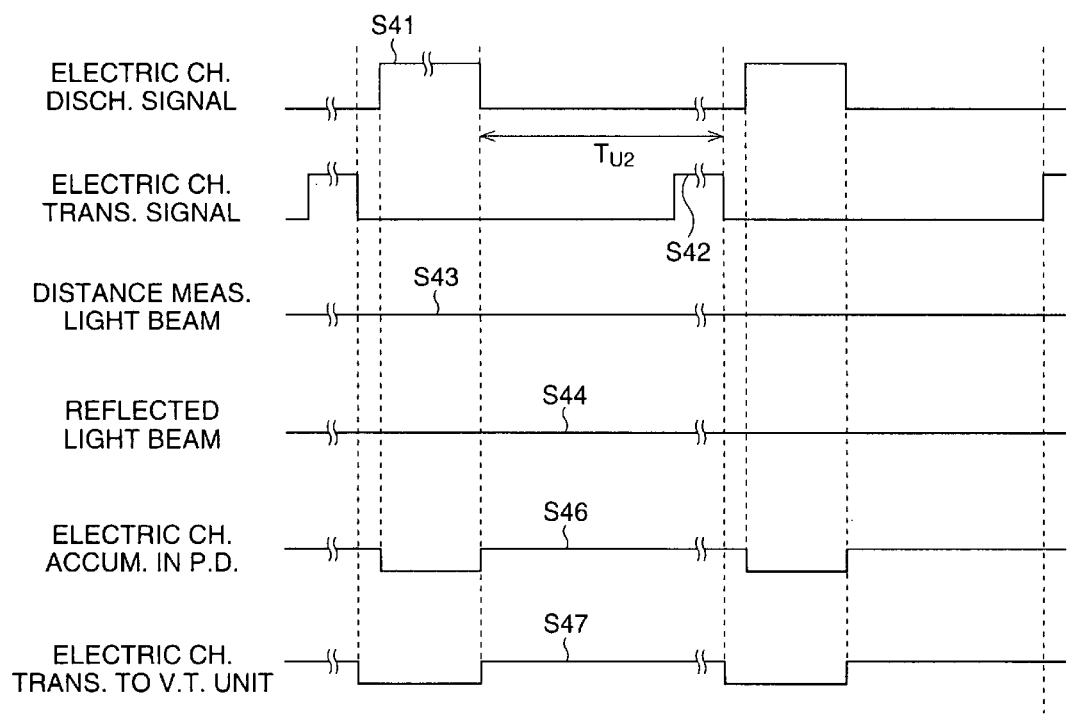
FIG. 11 is a timing chart of a reflectance correction information sensing operation in the first embodiment.
Figure 12:
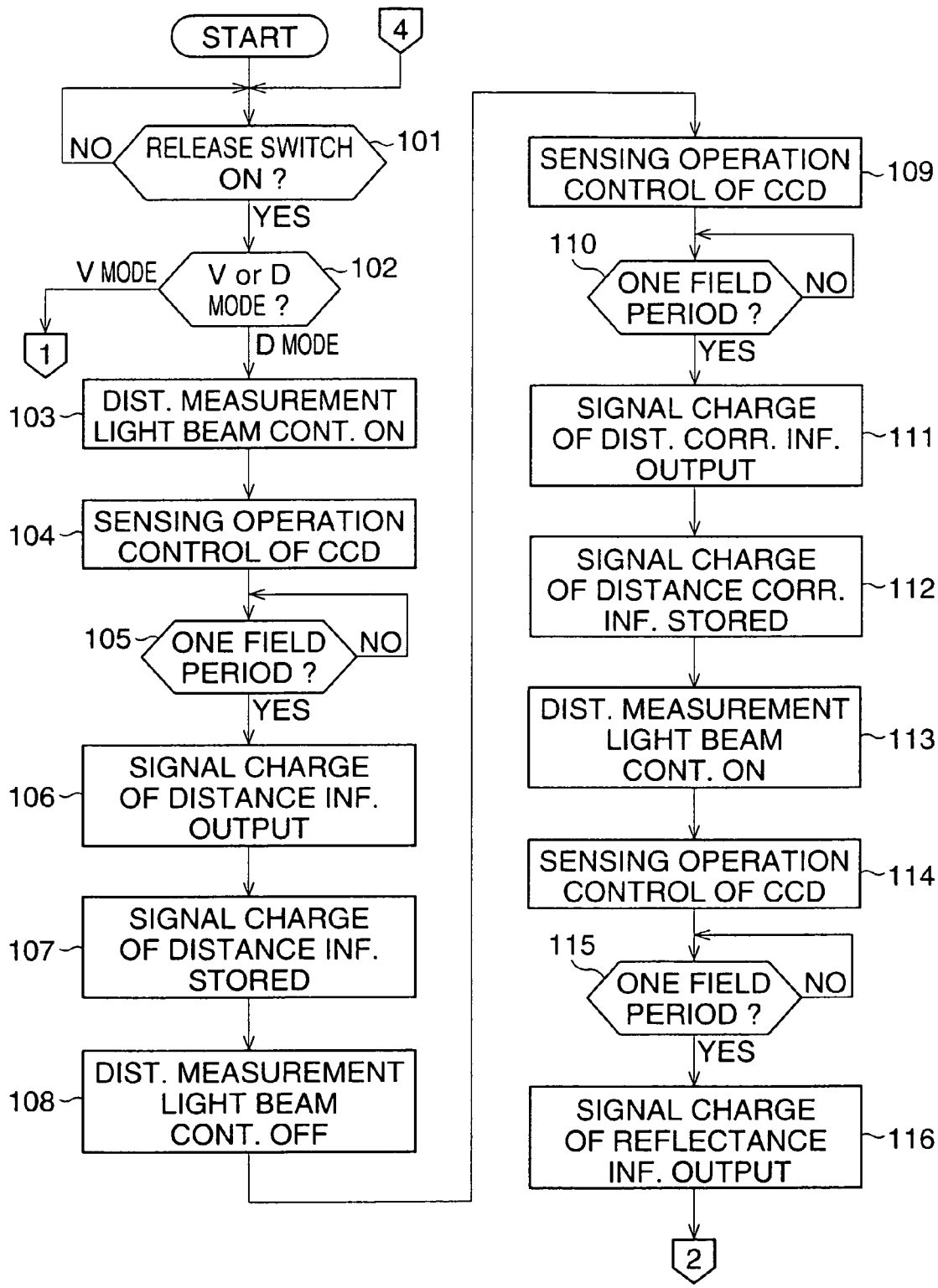
FIG. 12 shows the first part of a flowchart of the distance information sensing operation of the first embodiment.
Figure 13:
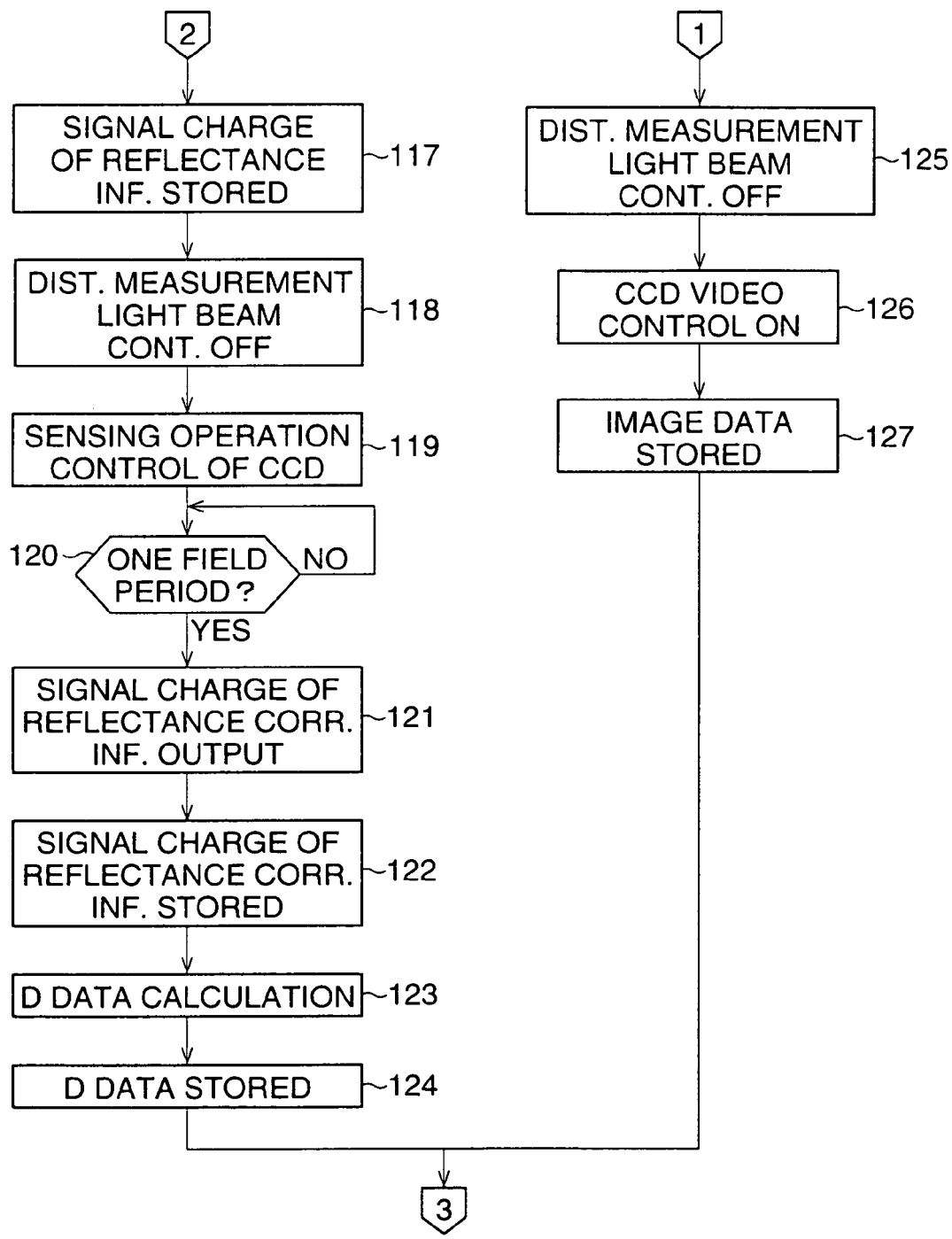
FIG. 13 shows the second part of a flowchart of the distance information sensing operation of the first embodiment.
Figure 14:
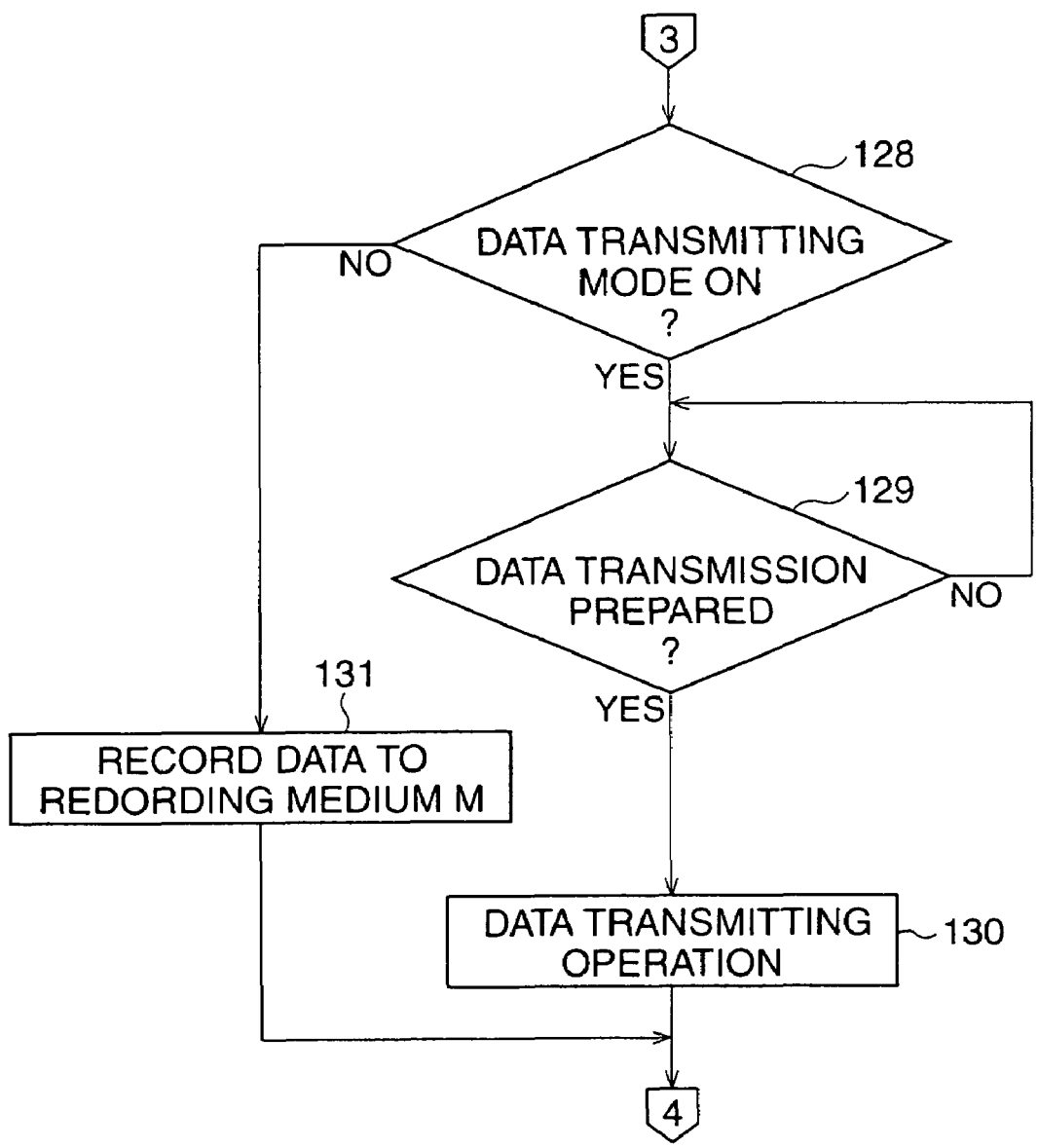
FIG. 14 shows the third part of a flowchart of the distance information sensing operation of the first embodiment.

FIG. 12 through FIG. 14 are a flow chart of the distance information sensing operation and data transmitting operation executed in the camera of the first embodiment. FIG. 9 through FIG. 11 are respective timing charts of a distance correction information sensing operation, a reflectance information sensing operation and a reflectance correction information sensing operation of the first embodiment.

When it is recognized in Step 101 that the release switch 15 is fully depressed, Step 102 is executed in which it is determined which mode is selected, a video (V) mode or a distance measurement (D) mode. A change between the modes is carried out by manually operating the V/D mode switch 18.

When the D mode is selected, Step 103 is executed in which the vertical synchronizing signal is output and a distance measuring light beam control is started. Namely, the light emitting device 14 is driven so that the distance measuring light beam S3 is intermittently output as a pulsed beam. Then, Step 104 is executed so that a sensing operation control of the CCD 28 is started. Namely, the distance information sensing operation described with reference to FIG. 8 is started, and thus the electric charge discharging signal S1 and the electric charge transfer signal S9 are alternately output, so that the signal charge S11 of the distance information is integrated in the vertical transfer unit 52.

In Step 105, it is determined whether one field period has elapsed since the beginning of the distance information sensing operation, i.e., whether a new vertical synchronizing signal has been output. When one field period has passed, the process goes to Step 106 in which the signal charge S11 of the distance information is output from the CCD 28. The signal charge S11 is then temporarily stored in the image memory 34 in Step 107. Then, in Step 108, the distance measuring light beam control is turned OFF, and thus the light emitting operation of the light emitting device 14 is terminated.

In Steps 109 through 112, the distance correction information sensing operation is performed. In Step 109, a vertical synchronizing signal is output, and a sensing operation control of the CCD 28 is started. Namely, as shown in FIG. 9, an electric charge discharging signal S21 and an electric charge transfer signal S22 are alternately output while the light emitting operation of the light emitting device 14 is not carried out, i.e., while the light source is not illuminated. Although the electric charge accumulation period $T_{U1}$ is the same as that of the distance information sensing operation shown in FIG. 8, the distance measuring light beam does not irradiate the measurement subject (reference S23), and thus there is no reflected light beam (reference S24). Therefore, although a signal charge of the distance information is not generated, a signal charge S25 corresponding to an interference or noise component is generated, since the noise component, such as ambient daylight, enters the CCD 28. When an electric charge transfer signal S22 is output, a signal charge S26, a charge accumulated during the electric charge accumulation period $T_{u1}$, is transferred to the vertical transfer unit 52. The signal charge S26 corresponds to distance correction information, which is used for correcting an error generated in the distance information due to the noise component, and is related to the electric charge accumulation period $T_{U1}$.

In Step 110, it is determined whether one field period has elapsed since the beginning of the distance correction information sensing operation, i.e., whether a new vertical synchronizing signal has been output. When one field period has passed, the process goes to Step 111 in which the signal charge S26 of the distance correction information is output from the CCD 28. The signal charge S26 is then temporarily stored in the image memory 34 in Step 112.

In Steps 113 through 117, the reflectance information sensing operation is performed. In Step 113, a vertical synchronizing signal is output, and a distance measuring light beam control of the CCD 28 is started. Namely, as shown in FIG. 10, a distance measuring light beam S33 is intermittently output as a pulsed beam. In Step 114, a sensing operation control of the CCD 28 is started, and thus an electric charge discharging signal S31 and an electric charge transfer signal S35 are alternately output. The electric charge of photo-diodes is discharged (reference S32) as the electric charge discharge signal S31 is output. After completion of an output of the electric charge discharge signal S31, a distance measurement light beam S33 is emitted from the light emitting device 14, and a reflected light beam S34 is made incident on the CCD 28. An electric charge transfer signal S35 is output after a period sufficient to detect the entire reflected light beam S34. Namely, the reflectance information sensing operation is controlled in such a manner that all of the reflected light beam S34 is received within an electric charge accumulation period $T_{U2}$, which is from an end of an output of the electric charge discharging signal S31 to an end of an output of the electric charge transfer signal S35. Note that, a width $T_s$ of the signal charge S33 accumulated in each of the photo-diodes 51 of the CCD 28 is the same as a width $T_s$ of the distance measuring light beam S33.

During a period in which all of the reflected light beam S34 is sensed, a signal charge S36 accumulated in the photo-diodes 51 is due to the reflected light beam S34 and the ambient daylight. The signal charges S37 and S38 are charges generated only by the ambient daylight. When the electric charge transfer signal S35 is output, the signal charge S39 is transferred to the vertical transfer unit 52.

Therefore, the signal charge, which is detected during the electric charge accumulation period $T_{u2}$, including the signal charge S'39 generated by the ambient daylight, does not depend upon the distance of the measurement subject, and corresponds to the reflectance information which depends on the reflectance of the surface of the measurement subject.

In Step 115, it is determined whether one field period has elapsed since the beginning of the reflectance information sensing operation, i.e., whether a new vertical synchronizing signal has been output. When one field period has passed, the process goes to Step 116 in which the signal charge S39 of the reflectance information is output from the CCD 28. The signal charge S39 is then temporarily stored in the image memory 34 in Step 117. Then, in Step 118, the distance measuring light beam control is turned OFF, and thus the light emitting operation of the light emitting device 14 is terminated.

In Steps 119 through 122, the reflectance correction information sensing operation is performed. In Step 119, a vertical synchronizing signal is output, and a sensing operation control of the CCD 28 is started. Namely, as shown in FIG. 11, an electric charge discharging signal S41 and an electric charge transfer signal S42 are alternately output while the light emitting operation of the light emitting device 14 is not carried out. Although the electric charge accumulation period $T_{U2}$ is the same as that of the reflectance information sensing operation shown in FIG. 10, the distance measuring light beam does not irradiate the measurement subject (reference S43), and thus there is no reflected light beam (reference S44). Therefore, although a signal charge of the reflectance information is not generated, a signal charge S46 corresponding to an interference component or a noise component is generated, since the noise component, such as ambient daylight, enters the CCD 28. A signal charge S47 is a charge accumulated during the electric charge accumulation period $T_{u2}$ and is transferred to the vertical transfer unit 52 by the electric charge transfer signal S42. The signal charge S47 corresponds only to reflectance correction information, which is used for correcting an error generated in the reflectance information due to the noise component, and is related to the electric charge accumulation period $T_{U2}$.

In Step 120, it is determined whether one field period has elapsed since the beginning of the reflectance correction information sensing operation, i.e., whether a new vertical synchronizing signal has been output. When one field period has passed, the process goes to Step 121 in which the signal charge S46 of the reflectance correction information is output from the CCD 28. The signal charge S47 is temporarily stored in the image memory 34 in Step 122.

In Step 123, a calculation process of the distance measurement (D) data is performed using the distance information, the distance correction information, the reflectance information and the reflectance correction information, which are obtained in Steps 103 through 122. The D data is output and stored in the image memory 34 in Step 124. The distance information sensing operation ends with Step 124 and the data transmitting operation then starts. The data transmitting operation is shown in the following steps of Step 128. Conversely, when it is determined in Step 102 that the V mode is selected, the distance measuring light beam control is turned OFF in Step 125, and a normal photographing operation (i.e., CCD video control) is turned ON. Then, the image of the measurement subject is sensed and the corresponding image data is stored in the image memory 34 at step 127. By this, the image sensing operation or photographing operation ends and the data transmitting operation is executed in the steps succeeding Step 128.

In Step 128 through Step 130, the data transmitting operation is performed. In Step 128, it is determined whether the data transmitting mode is set. When it is determined that the data transmitting mode is set, the process proceeds to Step 129. On the other hand, when it is determined that the data transmitting mode is not set, the data stored in the image memory 34 are recorded in the recording medium M in Step 131, then process returns to Step 101. The data transmitting mode is set by manually operating the data transmitting mode button 24. Namely, when the data transmitting button 24 is pressed, the data transmitting mode is set, and when it is pressed once more, the mode is canceled.

In Step 129, it is determined whether preparations for the data transmission are complete. When the preparations are complete, at Step 130 the pulse modulated data transmitting light beams, which is modulated according to the modulation signal of the data, are radiated from the light emitting device 14. When the entire data is transmitted to the computer system 36, the process returns to Step 101 and the process stands by until the release switch 15 is fully depressed. On the other hand, at Step 129 when it is determined that the preparation for the data transmitting is not complete, the process stands by at Step 129.

Next, with reference to FIGS. 8 through 11, the contents of the calculation executed in Step 123 is described below.

It is supposed that the measurement subject of reflectance R is illuminated and an image of the measurement subject is formed on the CCD 28 while regarding the measurement subject to be a two-dimensional light source. At this time, an output Sn, which is obtained by integrating an electric charge generated in a photo-diode for an electric charge accumulation period "t", is indicated as follows:

$$Sn = k \cdot R \cdot I \cdot t \quad (2)$$

wherein "k" is a proportional coefficient, which is varied in accordance with an F-number and a magnification of the photographing lens.

When the measurement subject is illuminated by light output from a light source, such as an infrared laser source, the luminance I is obtained by combining a luminance $I_S$, due to the light source and a luminance $I_B$ due to the ambient light, which is indicated as follows:

$$I = I_s + I_B \quad (3)$$

As shown in FIG. 8, it is supposed that the electric charge accumulation period is $T_{U1}$, the pulse width of the distance measuring light beam S3 is $T_s$, a pulse width of the signal charge S6 of the distance information is $T_D$, and the electric charge accumulation period is repeated N times (a predetermined number of times) for one field period. An output $SM_{10}$ of the CCD is:

$$SM_{10} = \sum (k \cdot R(I_S \cdot T_D + I_B \cdot T_{U1})) \quad (4)$$
$$= k \cdot N \cdot R(I_S \cdot T_D + I_B \cdot T_{U1})$$

wherein the pulse width $T_D$ is indicated as follows:

$$T_D = \delta \cdot t \quad (5)$$
$$= 2r/C$$

As shown in FIG. 10, when the electric charge accumulation period $T_{U2}$ is greater than the pulse width $T_s$, such that the electric charge accumulation period $T_{U2}$ is large enough to receive the whole of the reflected light beam, an output $SM_{20}$ of the CCD is:

$$SM_{20} = \sum (k \cdot R(I_S \cdot T_S + I_B \cdot T_{U2})) \quad (6)$$
$$= k \cdot N \cdot R(I_S \cdot T_S + I_B \cdot T_{U2})$$

As shown in FIG. 9, when the light beam is turned OFF to carry out a pulse-shaped electric charge accumulation, having a same width as that of FIG. 8 an output $SM_{11}$ of the CCD is:

$$SM_{11} = \sum (k \cdot R \cdot I_S \cdot T_{U1}) \quad (7)$$
$$= k \cdot N \cdot R \cdot I_S \cdot T_{U1}$$

Similarly, an output $S_{11}$ of the CCD, which is obtained when an electric charge accumulation shown in FIG. 11 is performed, is $$SM_{21} = \sum (k \cdot R \cdot I_S \cdot T_{U2}) \quad (8)$$
$$= k \cdot N \cdot R \cdot I_S \cdot T_{U2}$$

Based on the formulas (4), (6), (7) and (8), a following formula is obtained:

$$S_D = (SM_{10} - SM_{11})/(SM_{20} - SM_{21}) \quad (9)$$
$$= T_D/T_S$$

As described above, the distance measuring light beam S3 and the reflected light beam S4 contain noise, such as ambient daylight (i.e., a luminance $I_B$ due to ambient daylight) $T_D/T_S$ included in the formula (9) indicates that an amount of the reflected light beam S4 from the measurement subject, when the distance measuring light beam S3 is radiated, is normalized by an amount of the distance measuring light beam S3, and is equal to a ratio of a value in which the noise component ($SM_{11}$) (corresponding to the electric charge S26 shown in FIG. 9) is subtracted from the amount of the distance measuring light beam S3 ($SM_{10}$) (corresponding to the signal charge S11 shown in FIG. 8), to a value in which the noise component ($SM_{21}$) (corresponding to the electric charge S47 shown in FIG. 11) is subtracted from an amount of the reflected light beam S4 ($SM_{20}$) (corresponding to the signal charge S39 shown in FIG. 10.

$SM_{10}$, $SM_{11}$, $SM_{20}$ and $SM_{21}$ included in the formula (9) are stored as the distance information, the distance correction information, the reflectance information and the reflectance correction information, in Steps 107, 112, 117 and 122, respectively. Therefore, based on the information, $T_D/T_S$ is obtained. Since the pulse width $T_s$ is known, the distance r is obtained from formula (5) and $T_D/T_s$. Thus, based on the formula (5) and (9), the distance r from the camera body to each point on the surface of the measurement subject is corrected, so that an accuracy of a distance sensing is improved.

Figure 15:
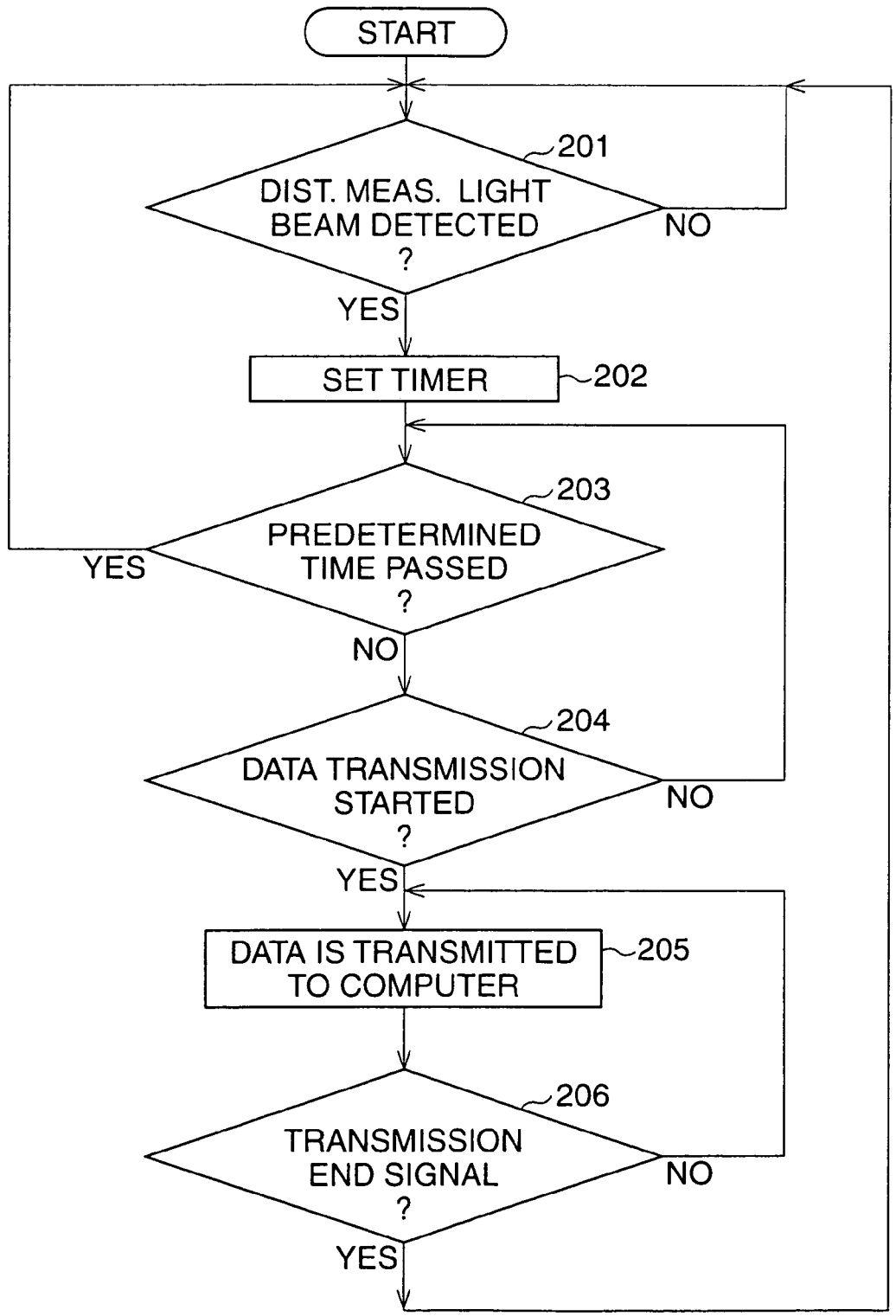
FIG. 15 shows a flowchart of the receiving operation in the optical transmission system of the first embodiment.

FIG. 15 is a flow chart of a data receiving operation executed on the computer system 46.

The receiver 47 is initially set to detect a distance measuring light beam. Namely, a frequency modulated laser beam in the band of the distance measuring light beam is only detectable. When the receiver 47 detects a distance measuring light beam in Step 201, the process proceeds to Step 202, in which a timer is set. In Step 203, it is determined whether a predetermined time has passed since the timer was set. When the predetermined time has not elapsed, it is then determined whether the data transmission has started. Namely, it is checked whether the receiver 47 has detected a data transmitting light beam, a band of which is ten times, for example, that of the distance measuring light beam. If a data transmitting light beam has not been detected, the process goes to Step 203, and it is again determined whether the predetermined time has elapsed since the timer was set. When the elapsed time of the timer is beyond the predetermined time, the process returns to Step 201, and prepares for the subsequent distance measuring light beam, which may be detected.

In Step 204 when a transmission start signal of the data transmitting light beam, for example, is detected by the receiver 47, so that it is determined that the data transmission has started, then in Step 205, the data transmitting light beams, which are transmitted from the light emitting device 14 of the camera in Step 130, are detected by the receiver 47 and are input to the computer system 46 as distance data and image data. In Step 206, it is determined whether a detected light beam, for example, corresponds to a transmission end signal. When the detected light beam corresponds to the transmission end signal, the receiving operation is terminated and the process returns to Step 201, at which the process stands by until the subsequent distance measuring light beam is detected. When the detected light beam is not the transmission end signal, the process returns to Step 205 and the succeeding light beam is detected.

As described above, according to the first embodiment, the miniaturized light weight handy three-dimensional image capturing device, which can transmit data to the computer system with no cable between, is obtained.

Figure 16:
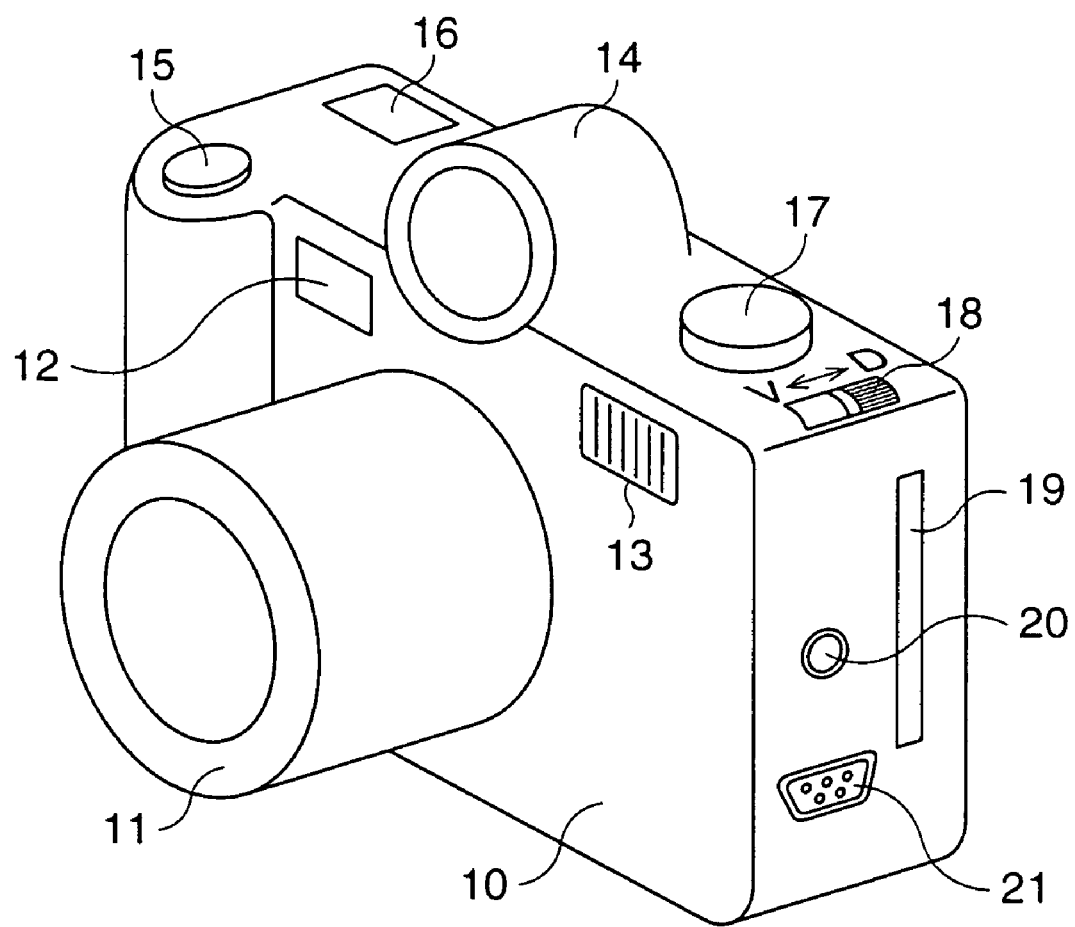
FIG. 16 is a perspective view showing a camera provided with a three-dimensional image capturing device of the second, third and fourth embodiment of the present invention.

FIG. 16 is a perspective view of a camera type optical reader (three-dimensional image capturing device) of a second embodiment of the present invention. The external view of the camera in the second embodiment is the same as that of the first embodiment except for the data transmitting mode button 24, which is shown in FIG. 1.

Figure 17:
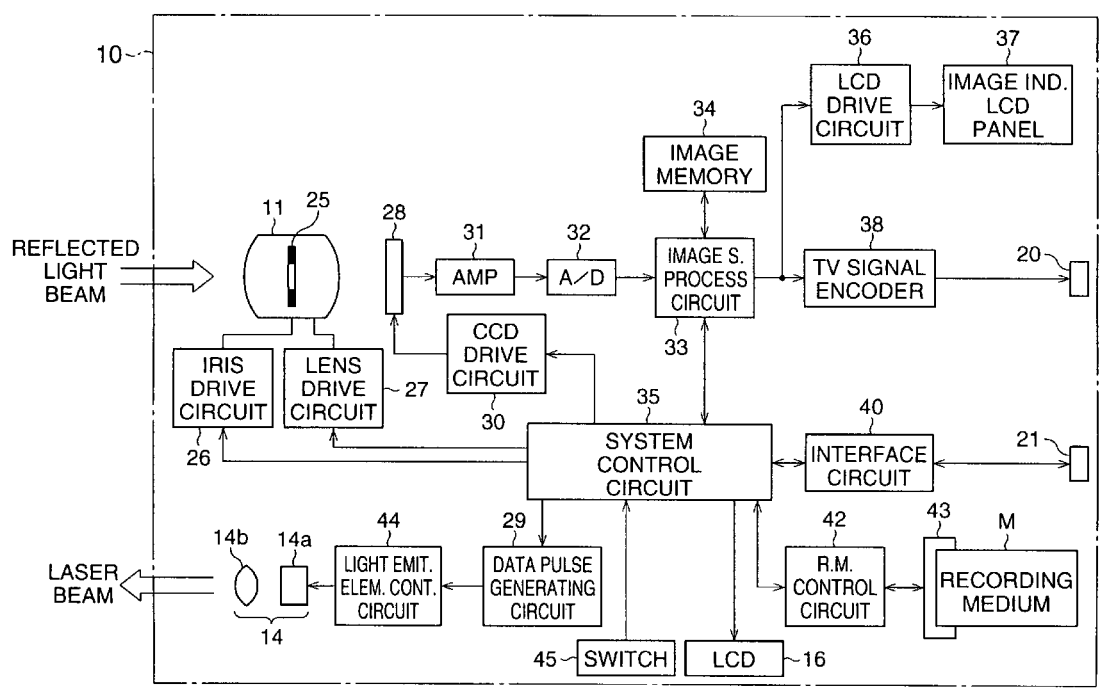
FIG. 17 is a block diagram showing an electrical construction of the camera in the second and third embodiment.

FIG. 17 is a block diagram showing an electrical construction of the camera of FIG. 16. Most of the structure, which is shown in FIG. 17, is the same as the structure shown in FIG. 2, which describes the electrical construction of the camera in the first embodiment. However, the camera in the second embodiment has a data pulse generating circuit 29, which generates data pulses and superposes the pulses onto an LD driving pulse. Namely, the light emitting element control circuit 44 is controlled by the system control circuit 35 through the data pulse generating circuit 29.

Figure 18:
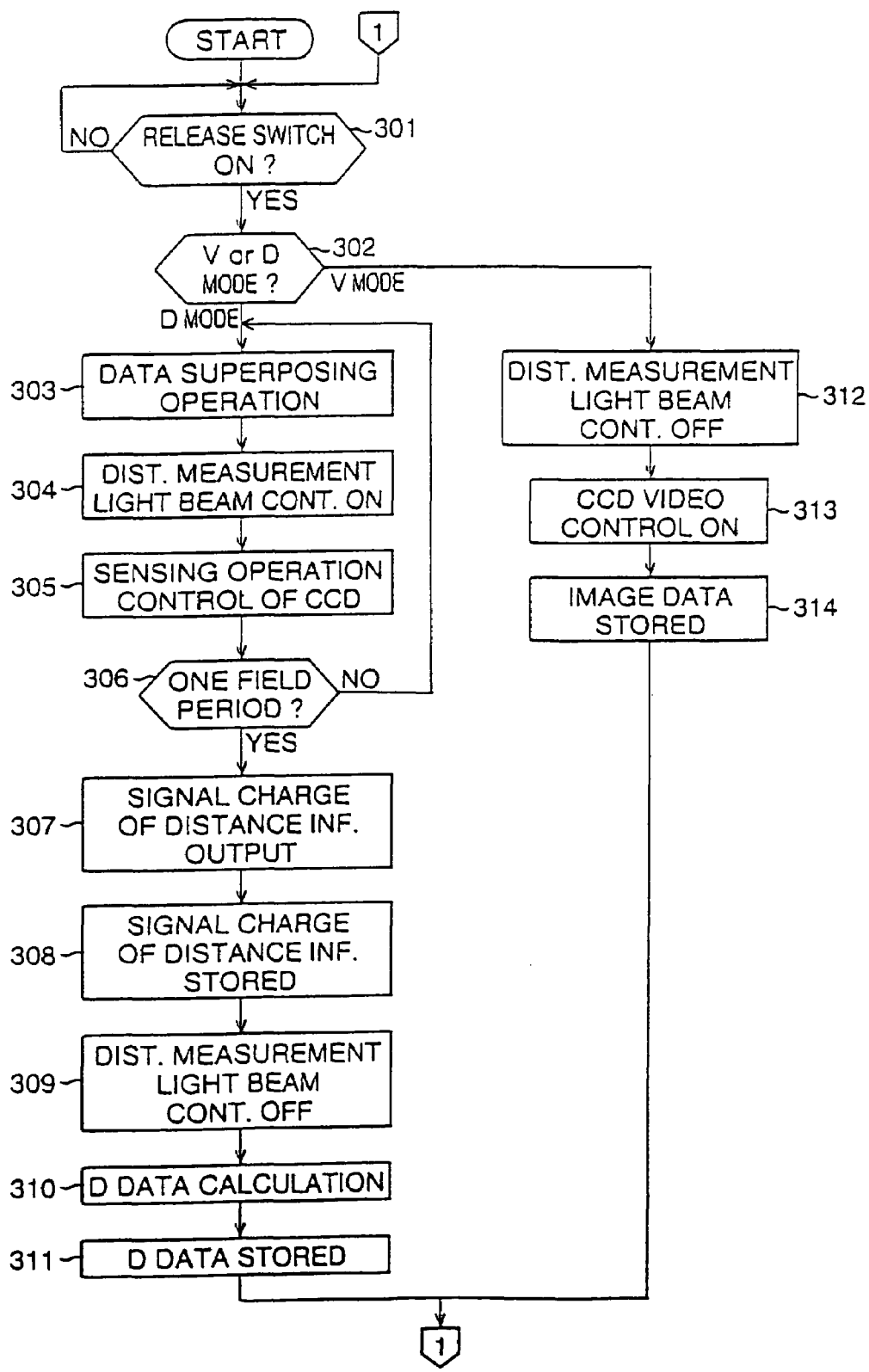
FIG. 18 shows a flowchart of the distance information sensing operation of the second, third and fourth embodiment.

FIG. 18 is a flow chart of a distance information sensing operation and a data transmitting operation executed in the second embodiment. The above operations are executed in the arrangement illustrated in FIG. 3.

In the second embodiment, the signal charge S13, shown in FIG. 8, due to the ambient daylight is ignored, since the amount of signal charge S13 is regarded as small enough to ignore when it is compared with the amount of signal charge S12. Further, influence of the reflectance information is also omitted so as to simplify the description. Namely, in the second embodiment, the distance correction information sensing operation, the reflectance information sensing operation and the reflectance correction information sensing operation, which are executed in the first embodiment, are omitted. Therefore, the process described from Step 109 to Step 122 in FIG. 12 and FIG. 13 is reduced. Note that, the above three operations may be carried out additionally if required.

When switch 15 is fully depressed in Step 301, then Step 302 is executed in which it is determined which mode is selected, a video (V) mode or a distance measurement (D) mode.

When the D mode is selected, a data superposing operation, which is described later, is executed in Step 303. In Step 304, the vertical synchronizing signal is output and a distance measuring light beam control is started. Namely, the light emitting device 14 is driven so that the distance measuring light beam S3 is intermittently output as a pulsed beam. Subsequently, Step 305 is executed so that a sensing operation control of the CCD 28 is started. Namely, the distance information sensing operation is started, and the signal charge S11 (see FIG. 8) of the distance information is integrated in the vertical transfer unit 52, as described in the first embodiment.

In Step 306, it is determined whether one field period has elapsed since the beginning of the distance information sensing operation, i.e., whether a new vertical synchronizing signal has been output. When one field period has not passed, the process returns to Step 303. On the contrary, when one field period has passed, the process goes to Step 307 in which the signal charge S11 of the distance information is output from the CCD 28. The signal charge S11 is then temporarily stored in the image memory 34 in Step 308. In Step 309, the distance measuring light beam control is turned OFF, and thus the light emitting operation of the light emitting device 14 is terminated. With the above operations, signal charge S11, due to each reiterated radiation, is accumulated in the CCD 28 for a predetermined number of times or one field period.

In Step 310, a calculation process of the distance measurement (D) data is performed using the distance information, which is obtained in Steps 304 through 308. The D data is output and stored in the image memory 34 in Step 311. Conversely, when it is determined, in Step 302, that the V mode is set, the process goes to Step 312. In Step 312, the distance measuring light beam control is turned OFF, and a normal photographing operation (i.e., CCD video control) is turned ON, in Step 313. Then, the image of the measurement subject is sensed and the corresponding image data is stored in the image memory 34 in step 314, and the process returns to the first step, Step 301.

Note that, the contents of the calculation process for the distance measurement (D) data, which is executed in Step 310, is similar to the contents described in the first embodiment. Namely, D data is obtained from the formula (4) and (5) with $I_B$ assumed to be zero in the formulas, and the reduced formula is described in the following form.

$$r = C \cdot SM_{10}/(2 \cdot K \cdot N \cdot R \cdot I_s) \tag{10}$$

Next, the process of the data superposing operation, which is executed in Step 303, is described with reference to FIG. 18 through FIG. 21.

Figure 19A:
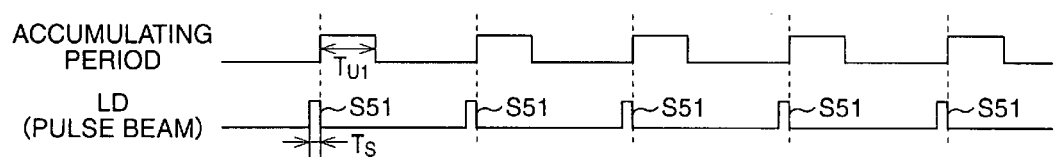
FIG. 19A shows a sequence of the pulse beam emission with no data transmitting operation in the second embodiment.
Figure 19B:
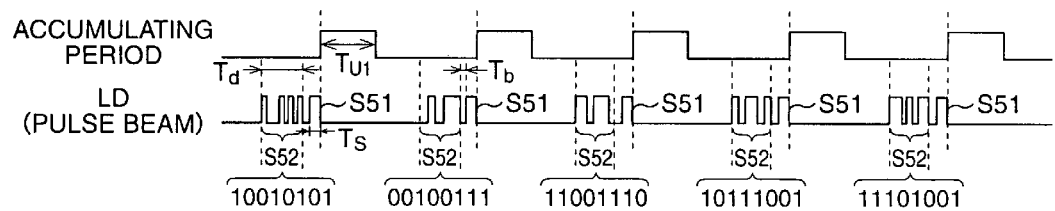
FIG. 19B shows a sequence of the pulse beam emission with the data transmitting operation of the second embodiment.

Each of FIG. 19A and FIG. 19B describes a sequence of the pulse beam radiation at the light emitting device 14, with reference to the accumulating period of the signal charge in the CCD. FIG. 19A shows a sequence of the pulse beam with no data superposing operation and therefore with no data transmitting, and FIG. 19B shows the sequence operation with the data superposing operation and therefore with data transmitting.

As for the timing of the accumulation of signal charge and the radiation of the distance measuring light beam S51, there is no difference between the operation (corresponding to FIG. 19B) with the data superposing process and the operation (corresponding to FIG. 19A) without the data superposing process. However, in the case of the operation with the data superposing, a set of pulse beam signals S52 that correspond to the transmitting data is radiated for a data period $T_d$, an interval between the subsequent radiations of the distance measuring light beams S51. Namely, an accumulation of the signal charge in a photo-diode 51, which continues for the period $T_{U1}$, approximately simultaneously begins with a fall of the distance measuring light beam S51. When a predetermined time elapses from the completion of the accumulation in the photo-diodes 51, the pulse beams S52, which represent the transmitting data, are radiated for the period $T_d$. After a predetermined interval, a blank period $T_b$, from the end of the data period $T_d$, in which a set of the pulse beam S52 is radiated, the subsequent distance measuring light beam S51 is emitted. Thus, the period ($T_d+T_b$), which is composed of the data period $T_d$ and the blank period $T_b$, is comprised in the interval between the fall of the electric charge transfer signal S 10 and the fall of the electric charge discharging signal (refer FIG. 8). The above operations continuously repeat until one field period elapses. Note that, the data transmitted in the above operations are distance data or image data, the data of which is sensed in the distance information sensing operation and stored in the image memory 34. Further, the data may comprise control data as required.

Each set of pulse beams S52, which is illustrated in FIG. 19B, represents 8 bits data, which corresponds to the binary number indicated under each of the pulse beams, as an example. Namely, data period $T_d$ is equally divided into eight intervals, and each interval corresponds to a binary digit. If there is a radiation of a pulse beam during an interval corresponding to a digit of an 8 bits number, the corresponding digit is "1", and if not, it is "0". Further, the distance measuring light beam S51 is also used as a synchronizing signal for the transmitting operations between the camera and the computer system, and each set of pulse beams S52 is emitted from the light emitting device when a predetermined period elapses from an end of each accumulating period $T_{U1}$.

Figure 20:
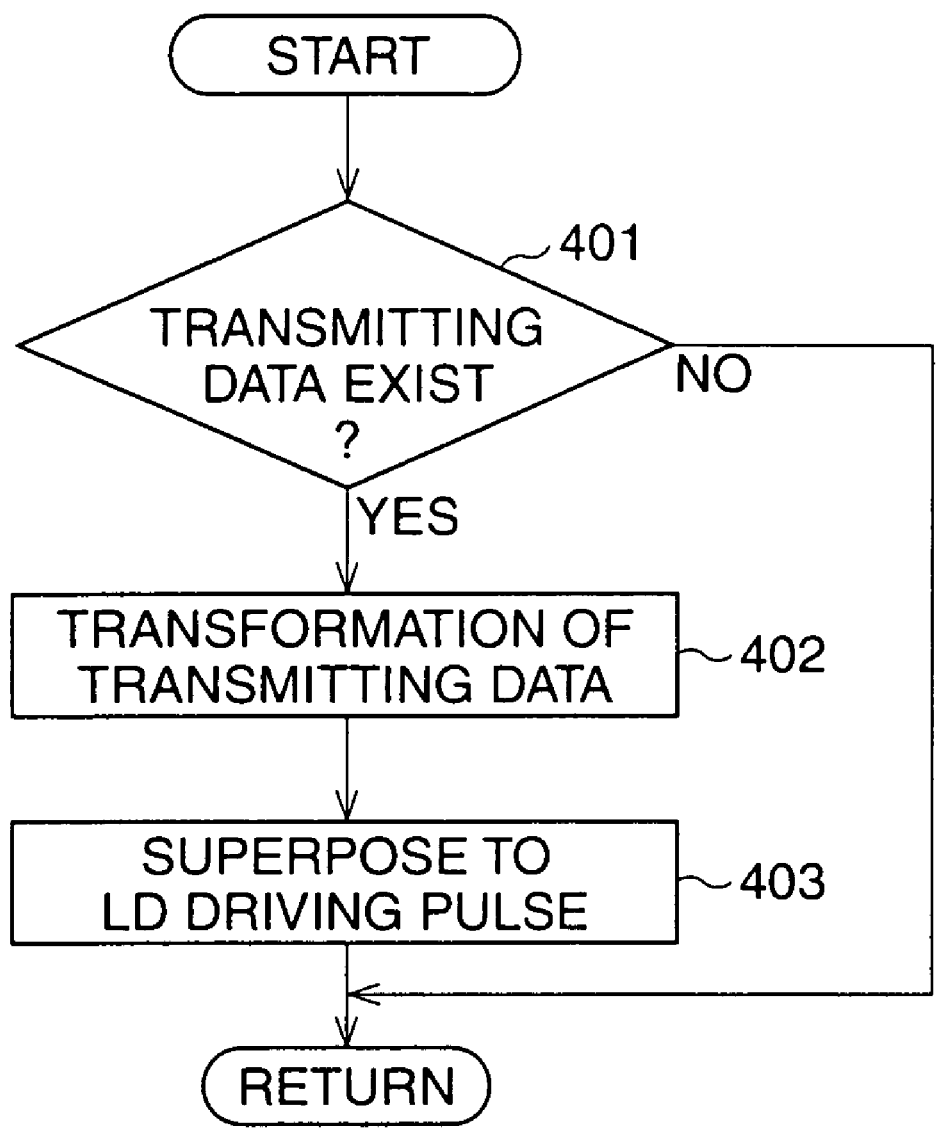
FIG. 20 is a flow chart of the data superposing operation in the second and third embodiment.

FIG. 20 is a flow chart of the data superposing operation which is executed in Step 303 of the flow chart described in FIG. 18. The data superposing operation is carried out when it is determined that the mode is set to D mode, in Step 302 of FIG. 18. In Step 401, a determination is made to confirm the existence of data to be transmitted. If there is data to be transmitted, in Step 402, an 8 bits data is read out from the image memory 34 and transformed to the signal which is to be superposed onto an LD driving pulse for driving the light emitting device (LD) 14. Then, data pulse that represents the 8 bits transmitting data is superposed onto the LD driving pulse and output from the data pulse generating circuit 29 in Step 403, and the process for data superposing operation for one set (8 bits) of data ends. On the contrary, when it is determined, in Step 401, that there is no data to be transmitted, this process ends with no superposing operation. Namely, the radiating sequence of the light emitting device 14 becomes the same as the sequence shown in FIG. 19A, in which the radiating sequence includes no data superposing process.

When the data superposing operation ends, the process goes to Step 304 (see FIG. 18), in which the vertical synchronizing signal may be output, and the radiation of the light emitting device 14 is controlled as to the LD driving pulse onto which the data pulse may be superposed in Step 403. Namely, since the processes from Step 303 through Step 306 are repeatedly executed for one field period, when there is data to be transmitted, the light emitting device 14 radiates pulse beams in the sequence shown in FIG. 19B, and the distance measuring operation is executed in the manner described in the previous description.

Figure 21:
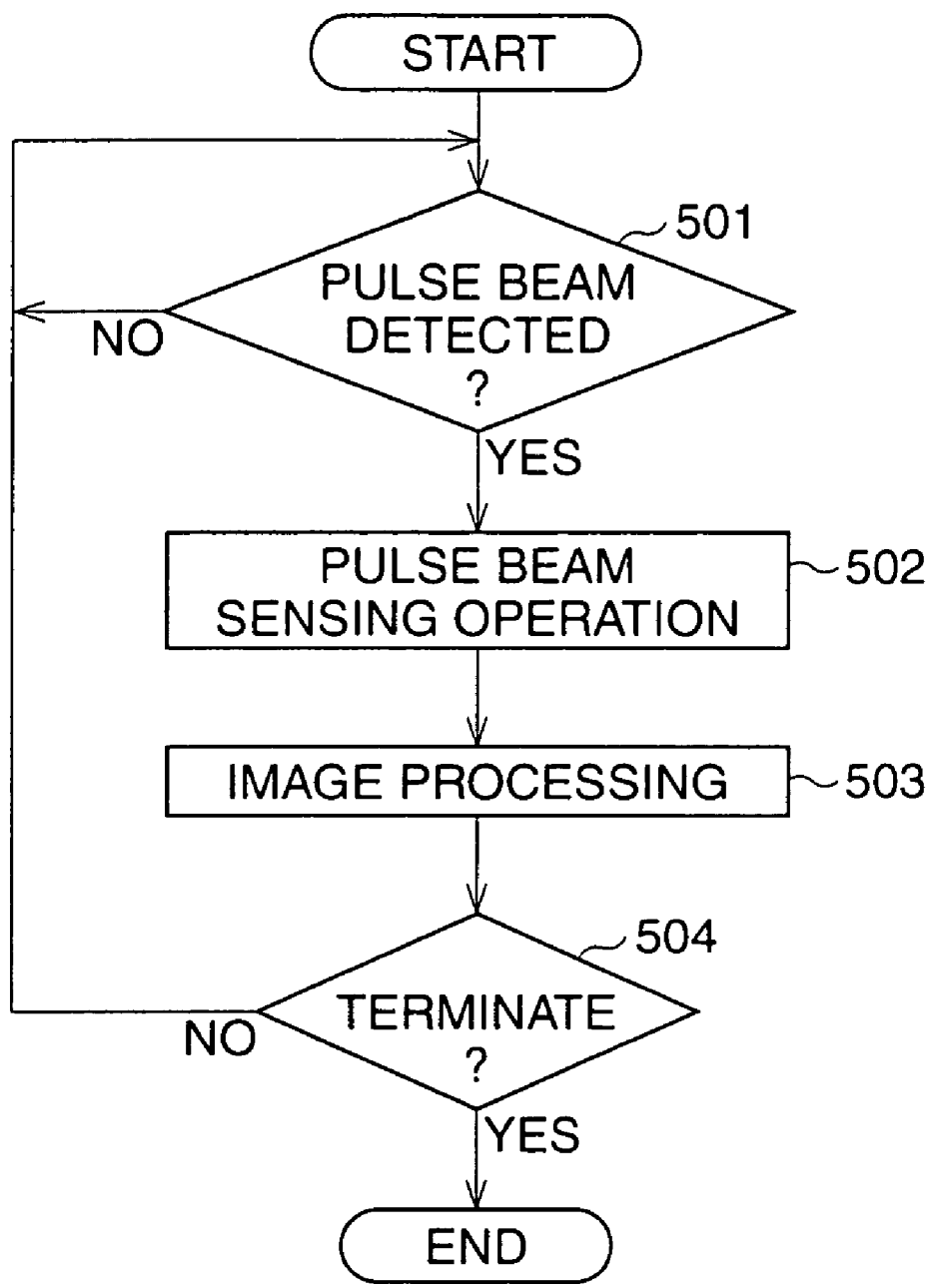
FIG. 21 is a flow chart of the receiving operation executed in the external computer system of the second and third embodiment.

A receiving operation of a data transmitting light beam in the second embodiment, which is carried out in the computer system 46, is described in the following with reference to FIG. 21, which shows a flow chart of the operation.

When a pulse beam, which is radiated from the light emitting device 14, is detected in the receiver 47, in Step 501, the process proceeds to Step 502 in which a sensing operation of pulse beam signals S52 is started. In Step 503, the image processing is performed to the image data and/or the distance data, which are successively received in Step 502, and displayed on the monitor of the computer system 46. In Step 504, it is determined whether to terminate the receiving operation. If a key in the keyboard of the computer system 46 that is assigned to ending the process of the receiving operation is pressed, for example, the operation is terminated, and if not, the process goes back to Step 501 and stands by for the next detection.

As described above, according to the second embodiment, the same advantage as the first embodiment is obtained. Further, in the second embodiment, the distance measuring light beams and the data transmitting light beams are superposed, so that the distance information sensing operation and the data transmitting operation are simultaneously executed, thus the efficiency of the data transmission improves.

Figure 22:
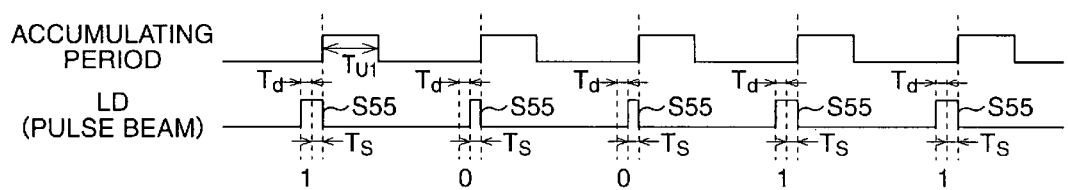
FIG. 22 shows a sequence of the pulse beam emission with the data transmitting operation of the third embodiment.

With reference to FIG. 22, a third embodiment of the present invention is described in the following. A difference between the second and third embodiment is only in a sequence of the radiation of the light emitting device 14. So that, in the second and third embodiment, a mechanical construction and an electrical construction are the same.

FIG. 22 shows a radiating sequence of the pulse beam of light emitting device (LD) 14, with reference to the accumulating period of the signal charge in the CCD 28.

In the third embodiment, the transmitting data is superposed onto the distance measuring light beams by modulating the duration of the pulse beams S55. The modulation, a pulse-width modulation, is achieved by modulating a leading-edge of the pulse beams, in other words, by changing a timing of the rise. Namely, a pulse beam S55 is modulated such that a width of which is either $T_s$ or $T_s+T_d$. The period $T_d$, the leading part of the pulse, is a period for the data, and period $T_s$, the trailing part of the pulse, is a period for the distance measuring light beam. The pulse beams regularly occur in the periods $T_s$, which are the trailing parts of the pulse beams S55, so that each of the pulse beams in the periods $T_s$ correspond to each of the accumulating periods. On the contrary, in the periods $T_d$, which are the leading parts of the pulse beam S55, an occurrence of the pulse beam is dependent on the data. Namely, when a pulse beam occurs in the period $T_d$, it represents "1" of a binary digit, and if not it represents "0" of the same. Therefore, a pulse beam S55 with the pulse width $T_s$ represents "0", and a pulse beam S55 with the pulse width $T_s+T_d$ represents "1". By repeatedly radiating the pulse beams S55, the widths of which are modulated in the above manner, for one field period, the data in the camera is transmitted to the computer system 46. Note that a data superposing operation in the present embodiment is also carried out in Step 303, as mentioned in the second embodiment. Further, timing of the data period $T_d$ is set so as not to affect the distance information sensing operation.

As described above, according to the third embodiment, the same advantage as the second embodiment is obtained.

With reference from FIG. 23 through FIG. 30, a fourth embodiment of the present invention is described. The mechanical configuration of the present embodiment is the same as those in the previous embodiments. So, the perspective view of a camera type three-dimensional image capturing device in the fourth embodiment is the same as FIG. 1. Further, the device is also utilized in the arrangement shown FIG. 3.

Figure 23:
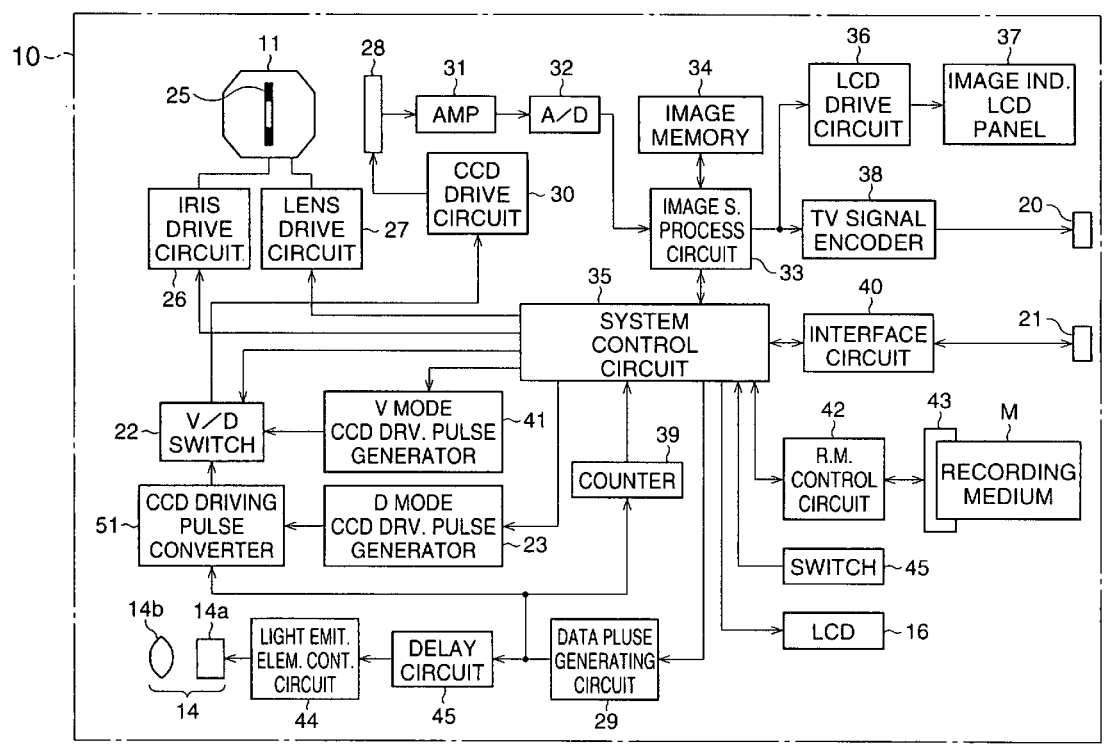
FIG. 23 is a block diagram showing an electrical construction of the camera in the fourth embodiment.

FIG. 23 is a block diagram showing an electrical construction of the fourth embodiment. The electrical construction of the fourth embodiment is similar to the embodiments described above except for blocks relating to the CCD driving pulse and the LD driving pulse.

An operation of the light emitting element 14a is controlled by the light emitting element control circuit 44, and the light emitting element control circuit 44 is controlled by the pulse signal output from the delay circuit 45. The pulse signal, which is output from the delay circuit 45, is a data pulse signal output from the data pulse generating circuit 29, a phase of which is delayed at the delay circuit 45. Further, the data pulse signal is a sequential pulse signal that represents the transmitting data with certain binary digits, and the data pulse generating circuit 29 is controlled by the system control circuit 35.

The light emitting element 14a radiates laser pulse beams that comprise the distance measuring light beams and the data transmitting light beams, which are superposed with each other. Thus, the receiver 47 receives and detects the laser beams, and the data in the camera is transmitted to the computer system 46. The data pulse signal, which is output from the data pulse generating circuit 29 to the delay circuit 45, is also output to the CCD driving pulse converter 51 and counter 39, simultaneously. The counter 39 counts the number of the data pulses and outputs the number to the system control circuit 35.

In the D mode CCD driving pulse generator 23, a standard CCD driving pulse, which is a standard pulse signal for the distance measuring sensing operation, is generated and output to the CCD driving pulse converter 51. The CCD driving pulse converter 51 converts the standard CCD driving pulse to the CCD driving pulse that controls the accumulating operation of the signal charge in CCD 28, so that the accumulation is performed synchronously with the light emitting operation of the light emitting element 14a based on the data pulse. The CCD driving pulse is then output to the CCD drive circuit 30 via V/D switch 22.

In the V mode CCD driving pulse generator 41, the CCD driving pulse that performs the normal video control of the CCD 28 is generated, and the CCD driving pulse is output to the CCD drive circuit 30 via the V/D switch 22. The V/D switch 22 alternatively outputs the CCD driving pulse from the V mode CCD driving pulse generator 41 or the CCD driving pulse converter 51 to the CCD drive circuit 30 in accordance with the mode selected by the V/D mode switch 18. The V/D switch 22, the V mode CCD driving pulse generator 41 and the D mode CCD driving pulse generator 23 are controlled by the system control circuit 35.

Figure 24:
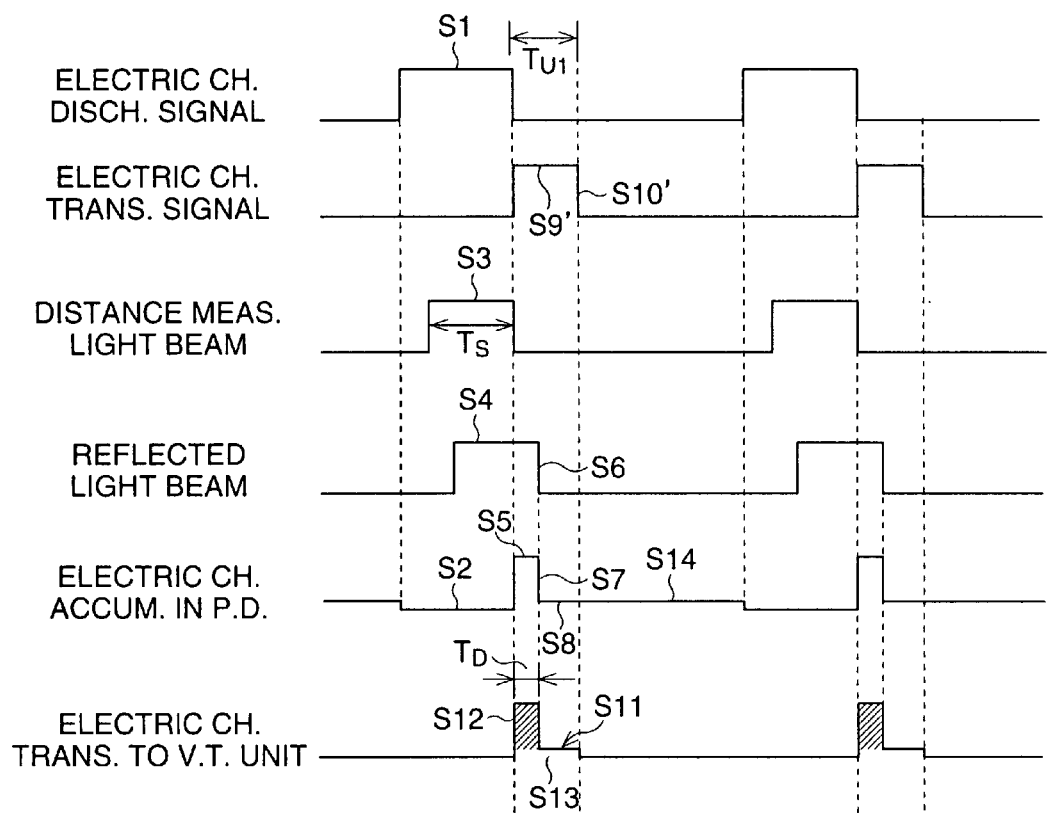
FIG. 24 is a timing chart of a distance information sensing operation by which data, corresponding to a distance from a camera body to each point on a surface of the measurement subject, is sensed in the fourth embodiment.

FIG. 24 shows a timing chart of the distance information sensing operation in the fourth embodiment. The timing in the present embodiment is slightly different from the timing shown in FIG. 8. In the present embodiment, the electric charge transfer signal S9' is output approximately simultaneously with the completion of the electric charge discharging signal S1. The rest of the timing chart is the same as that in FIG. 8. Thus the distance information is obtained in the manner described in the second embodiment.

Further, the flow chart of the distance information sensing operation in the present embodiment is also the same as that of the second embodiment shown in FIG. 18.

Figure 25:
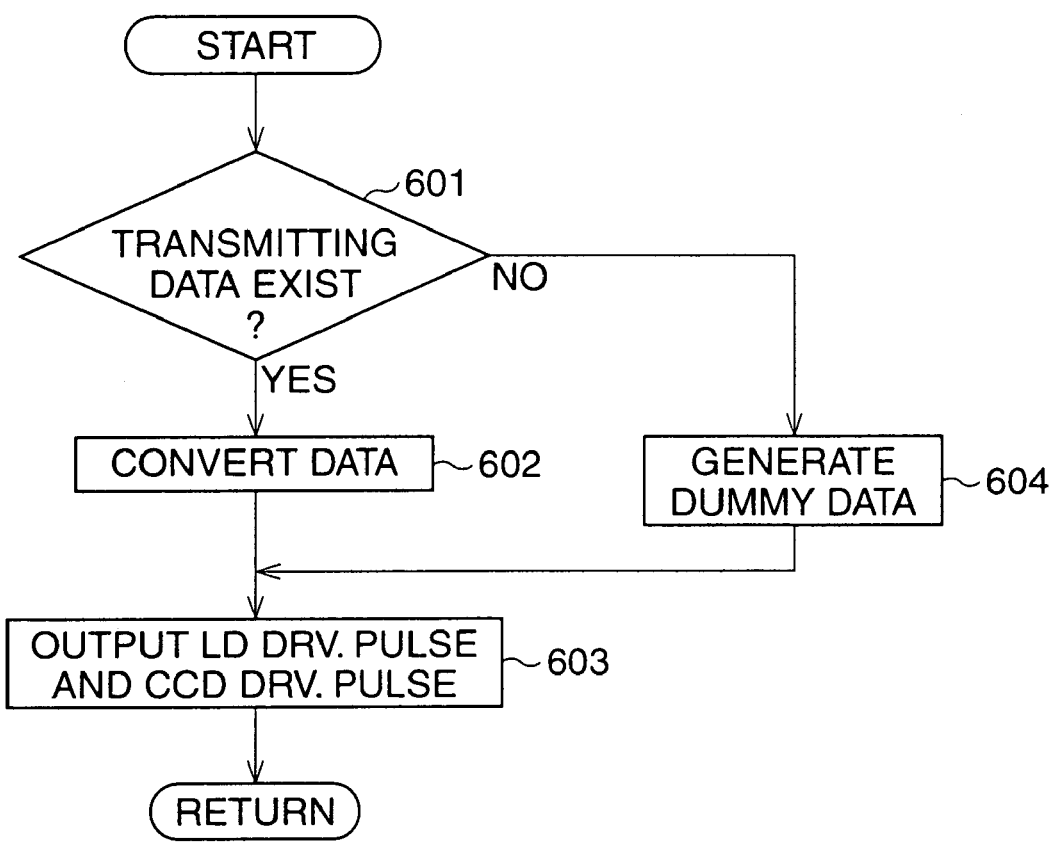
FIG. 25 is a flow chart of the data superposing operation in the fourth embodiment.

FIG. 25 describes the flow chart of the data superposing operation in the fourth embodiment. This operation is executed in Step 303 in FIG. 18.

In Step 601, the existence of the transmitting data is confirmed. When the transmitting data exists, the data is read out from the image memory 34 in Step 602, and the data pulse signal of the data is generated in the data pulse generating circuit 29. The data pulse signal is then output to the delay circuit 45, the counter 39 and the CCD driving pulse converter 51. In Step 603, the data pulse signal is delayed in the delay circuit 45 and output to the light emitting control circuit 44, as the LD driving pulse, which controls the light emitting element 14a. Further, at the same time, the CCD driving pulse converter 51 converts the standard CCD driving pulse, which is generated in the D mode CCD driving pulse generator 23, to the CCD driving pulse, so that the accumulation of the electric charge in the photo-diodes 51 may be matched with the light emitting operation of the light emitting element 14a, which is controlled by the data pulse, for the distance information sensing operation. Then the superposing operation ends.

On the other hand, when it is determined in Step 601 that there is no data to be transmitted, the process proceeds to Step 604 and dummy data is generated in the system control circuit 35. The dummy data is generated for carrying out the distance information sensing operation even though the transmitting data does not exist. Namely, the dummy data is only used for instructing the timing of the distance measuring light beam radiation, and it has no specific information as transmitting data. The dummy data is output to the data pulse generating circuit 29 and a corresponding data pulse is generated. The data pulse is then output to the delay circuit 45, counter 39 and CCD driving pulse converter 51.

In Step 603, the data pulse of the dummy data is delayed in the delay circuit 45, and output to the light emitting control circuit 44 as the LD driving pulse, which controls the light emitting element 14a. Further, at the same time, the CCD driving pulse converter 51 converts the standard CCD driving pulse, which is generated in the D mode CCD driving pulse generator 23, to the CCD driving pulse, so that the accumulation of the electric charge in the photo-diodes 51 may be matched with the light emitting operation of the light emitting element 14a, which is controlled by the data pulse of the dummy data, for the distance information sensing operation. Then the superposing operation ends.

Figure 26:
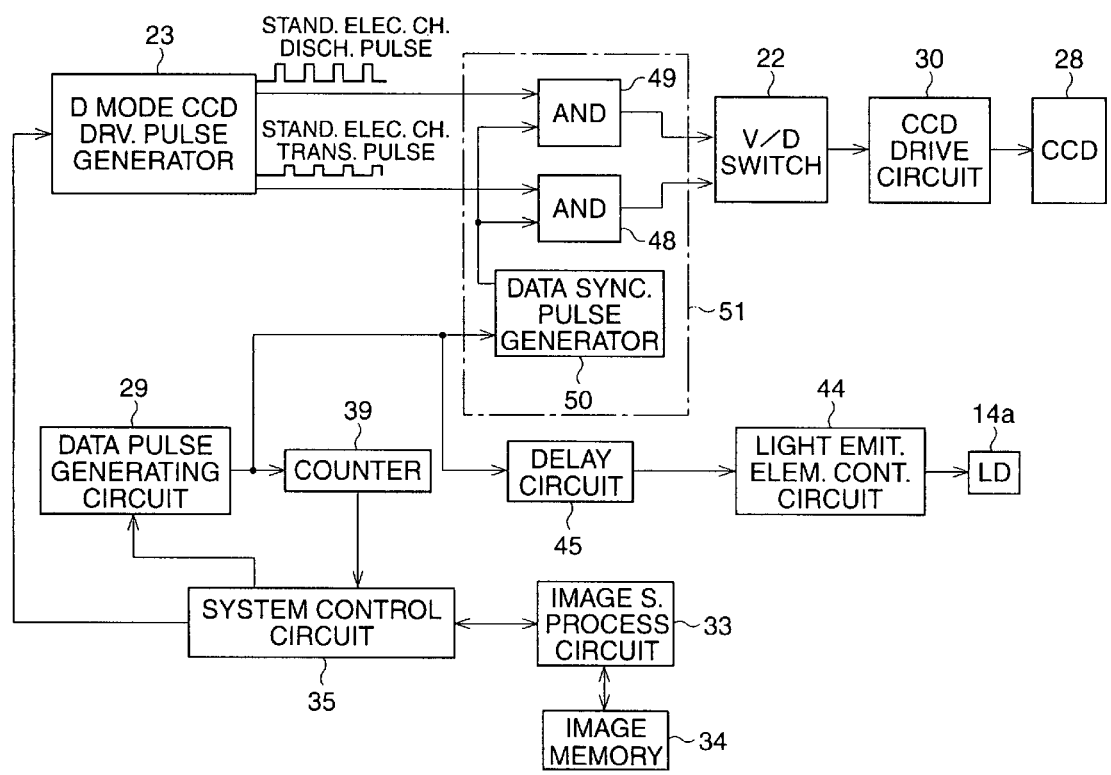
FIG. 26 shows the detail of the CCD driving pulse converter and the blocks that relate to the data superposing operation in the block diagram shown in FIG. 23.
Figure 27:
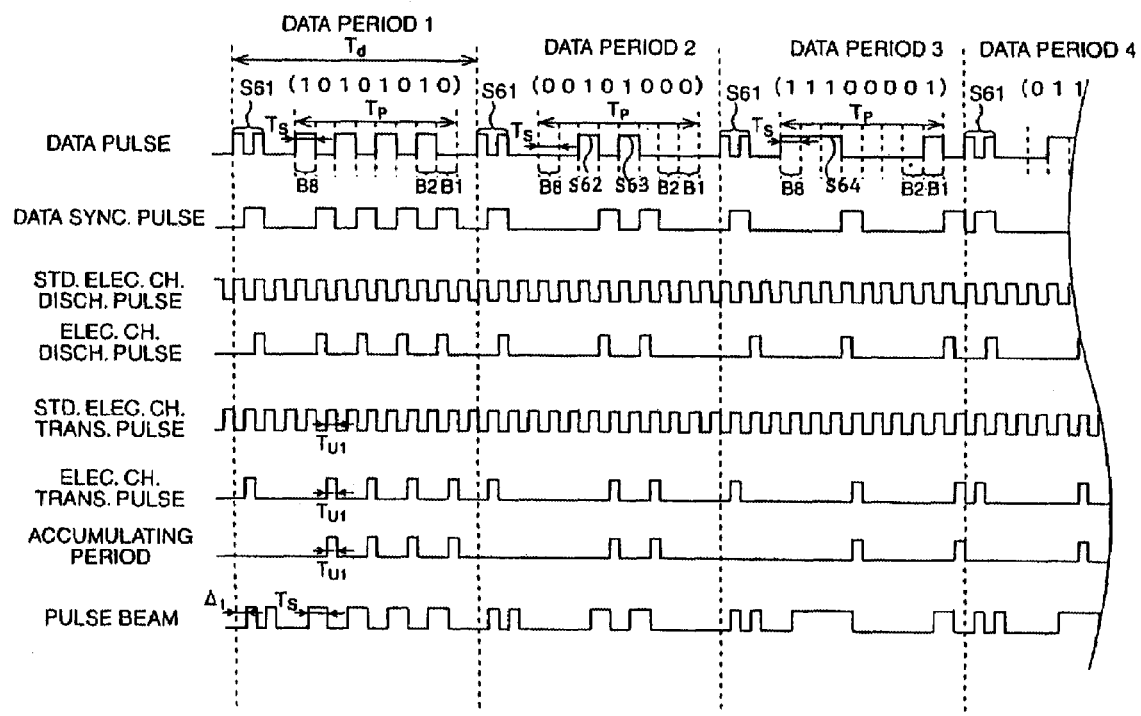
FIG. 27 is the sequence of the pulse signals output from the blocks shown in FIG. 26, during the data transmitting period.

With reference to FIG. 26 and FIG. 27, the data superposing operation of the fourth embodiment is described in the following. FIG. 26 shows the detail of the CCD driving pulse converter 51 and blocks that relate to the data superposing operation in the block diagram shown in FIG. 23. Further, FIG. 27 describes the sequence of the pulse signals output from the circuits or blocks shown in FIG. 26, the accumulating period of the photo-diodes 51 and pulse beams radiated from the light emitting device (LD) 14.

A pulse pair S61 represents a partition signal that delimits a sequence of the transmitting data by predetermined binary digits of the data. Namely, the period $T_d$, from the first rise of a pulse pair S61 to the first rise of the next pulse pair S61, is one data period. For example, the transmitting data is 8 bits data, and the transmitting data is divided by the partition signal S61 for each set of 8 bits data. The 8 bits data pulse in each data period is output during a period $T_P$ of the data period. The period $T_P$ comprises eight digit periods, and each of the digit periods corresponds to one digit of the 8 bits data. If a pulse exists in a digit period, the value of corresponding digit is "1", and if not, corresponding digit is "0".

A binary number indicated in each data period represents a transmitting data of 8 bits. Each digit of these 8 bits binary number corresponds to a digit period of the period $T_P$ one-to-one. Namely, the first digit of the binary number corresponds to the rightmost digit period B1 of the period $T_P$, and the second digit to the second digit period from the right, the digit period B2. Each digit corresponds to each digit period, respectively, thus the eighth digit corresponds to the eighth digit period from the right or the leftmost digit period B8. For example, in the second data period from the left side of FIG. 27, the corresponding transmitting data is "00101000" of which the fourth and sixth digit are "1" and the remaining digits are "0", thus a pulse only exists in the fourth and sixth digit periods from the right. Namely, the pulse S62 corresponds to the sixth digit and the pulse S63 to the fourth digit. Further, 8 digits binary data in the third data period from the left is "11100001" of which the upper three digits are all "1", so a pulse exists in each of the corresponding three digit periods. Consequently, the three pulses, each in consecutive digit periods, compose a single continuous pulse S64.

A data pulse shown in FIG. 27 is transferred to the light emitting drive circuit 44 as a LD driving pulse through the delay circuit 45. The sequence of the pulse beam radiated from the light emitting element (LD) 14a, which corresponds to the data pulse sequence, is shown at the bottom of FIG. 27. The sequence of the pulse beam is the same as Δt delayed sequence of the data pulse delayed from the original sequence, so the light emitting element 14a radiates laser pulse beams according to the binary number in each data period.

Furthermore, since the pulse beam is used as a distance measuring light beam, the width of the digit period corresponds to the width of the distance measuring light beam, the pulse width $T_s$. In the present embodiment, distance information sensing operation is carried out by detecting the fall of the reflected light beam during the accumulating period in the photo-diodes 51. Therefore, each accumulating period in the photo-diodes 51 should be adjusted to each fall of the pulse beam. Namely, the CCD driving pulse converter 51 needs to convert the standard CCD driving pulse, which is generated in the D mode CCD driving pulse generator 23, to a CCD driving pulse adjusted to the fall of the pulse beam.

The standard CCD driving pulse, which is generated in the D mode CCD driving pulse generator 23, is a regular pulse, and it comprises a standard electric charge discharging pulse and a standard electric charge transfer pulse. The standard electric charge discharging pulse is a pulse that leads an electric charge discharging operation, and the standard electric charge transfer pulse is a pulse that leads an electric charge transfer operation.

The CCD driving pulse converter 51 is comprised of the data synchronizing pulse generator 50 and the AND circuits 48 and 49. The data pulse signal that is input to the CCD driving pulse converter 51 is firstly converted to the data synchronizing pulse at the data synchronizing pulse generator 50. Then the data synchronizing pulse is output to the AND circuit 48 and 49. At the AND circuit 49, a conjunction of the data synchronizing pulse and the standard electric charge discharging pulse, which is output from the D mode CCD driving pulse generator 23 is carried out and the resultant pulse is output to the v/D switch 22 as an electric charge discharging pulse (electric charge discharging signal). On the other hand, at the AND circuit 48, a conjunction of the data synchronizing pulse and the standard electric charge transfer pulse, which is output from the D mode CCD driving pulse generator 23 is carried out and the resultant pulse is also output to the V/D switch 22 as an electric charge transfer pulse (electric charge transfer signal).

The electric charge discharging pulse and electric charge transfer pulse, which are CCD driving pulses, are output to the CCD drive circuit 30 through the V/D switch 22, and control the electric charge discharging operation and the electric charge transfer operation at the photo-diodes 51 in CCD 28, respectively.

As described with reference to FIG. 24, the signal charge accumulating operation at the photo-diodes 51 is executed during the accumulating period $T_{U1}$, which corresponds to a pulse width of the pulse S9', which rises approximately simultaneously with the fall of the electric charge discharging signal S1. Therefore, when a sequence of the data pulse is just as the sequence described in FIG. 27, the standard electric charge discharging pulse and the standard electric charge transfer pulse are converted to the electric charge discharging pulse and the electric charge transfer pulse described in FIG. 27, respectively. Consequently, the signal charge accumulations at the photo-diodes 51 are performed at the timing described in the sequence of FIG. 27., which is the second sequence from the bottom. By this, the signal charge accumulating operation at the photo-diodes 51 is adjusted to the fall of the pulse beam radiated from the light emitting device 14.

As described above, the pulse beams of the light emitting element 14a are radiated according to the data pulse signal corresponding to the transmitting data, so that the radiated pulse beam is used as a data transmitting light beam. At the same time, since the signal charge accumulating operation is adjusted at the fall of the pulse beam, the pulse beam is used as a distance measuring light beam. Thus, the data transmitting light beam and the distance measuring light beam are superposed with each other.

With reference to FIG. 26 to FIG. 29, the description of the light amount supplement operation in the present embodiment is given.

As described in FIG. 27, transmitting data in each data period may be different from one another, thus the number of the falls in each data period may also be different in each data period. Moreover, since the signal charge accumulation for the distance measurement is synchronously carried out with the fall of the pulse beam, the number of signal charge accumulations depends on the transmitting data in each data period. For example, in FIG. 27, the numbers of signal charge accumulations in each data period are, four in the first data period, two in the second and two in the third, in which the ordinal is from the left. Therefore, the number of signal accumulations in a distance information sensing operation depends on the transmitting data, and as a result, the accuracy of the distance measurement is deteriorated, since the output $SM_{10}$, a total amount of the signal charge, depends on the transmitting data.

Figure 28:
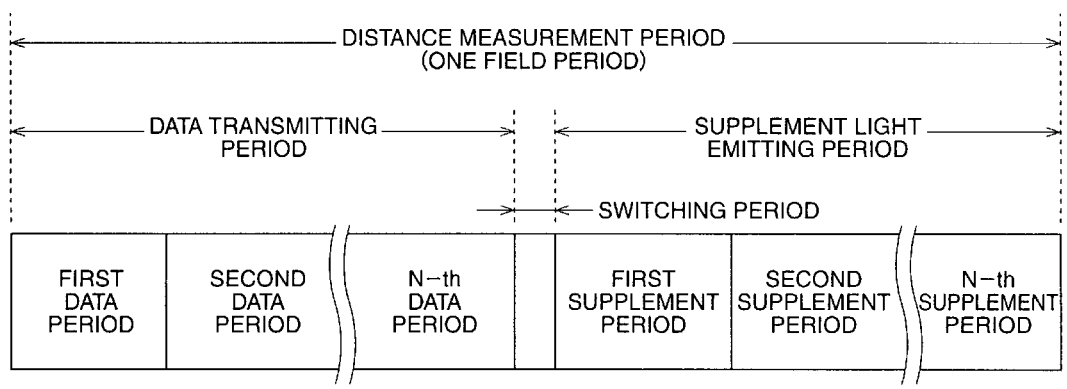
FIG. 28 shows the sequence of the data transmitting period and the supplement light emitting period, which comprise the distance measuring period of the distance information sensing operation executed in the fourth embodiment.

In the present embodiment, the light amount supplement operation is carried out and the number of the signal charge accumulation or the integration executed in a distance information sensing operation is fixed to a predetermined number, so that the output $SM_{10}$ is independent of the transmitting data. FIG. 28 shows the sequence of the light emitting operation executed in the distance information sensing operation, which is accompanied by the light amount supplement operation.

A distance measuring period or one field period, in which the light emitting operation for the distance information sensing operation is performed, comprises a data transmitting period and a supplement light emitting period. In the data transmitting period, the light emitting device 14 radiates pulse beams for the transmitting data signals, and in the supplement light emitting period, the above light amount supplement operation, which radiates light beams so as to compensate the number of the integrating operation or the signal charge accumulating operation, is carried out. The number of the data pulses output from the data pulse generating circuit 29 is counted in the counter 39, so the number of the accumulations or the integrations during the data transmitting period is obtained at the end of the data transmitting period. From the number of the accumulations counted in the data transmitting period, the remaining number of the accumulations for the distance information sensing operation is calculated, and the radiation of the light beams and the corresponding accumulations are carried out in the supplement light emitting period for the remaining number of times. For example, if the predetermined number of the accumulations executed in the distance information sensing operation is six hundred thousand and the number of accumulations executed in the data transmitting period is three hundred thousand, the number of beam pulse radiations or the corresponding signal charge accumulations, which is executed in the supplement light emitting period, becomes three hundred thousand. Further, if the number of the accumulations executed in the data transmitting period is four hundred thousand, the number of beam pulse radiations or the signal charge accumulations, which is executed in the supplement light emitting period, becomes two hundred thousand. Note that there may be provided a switching period, during which the operation switches, between the data transmitting period and the supplement light emitting period.

Figure 29:
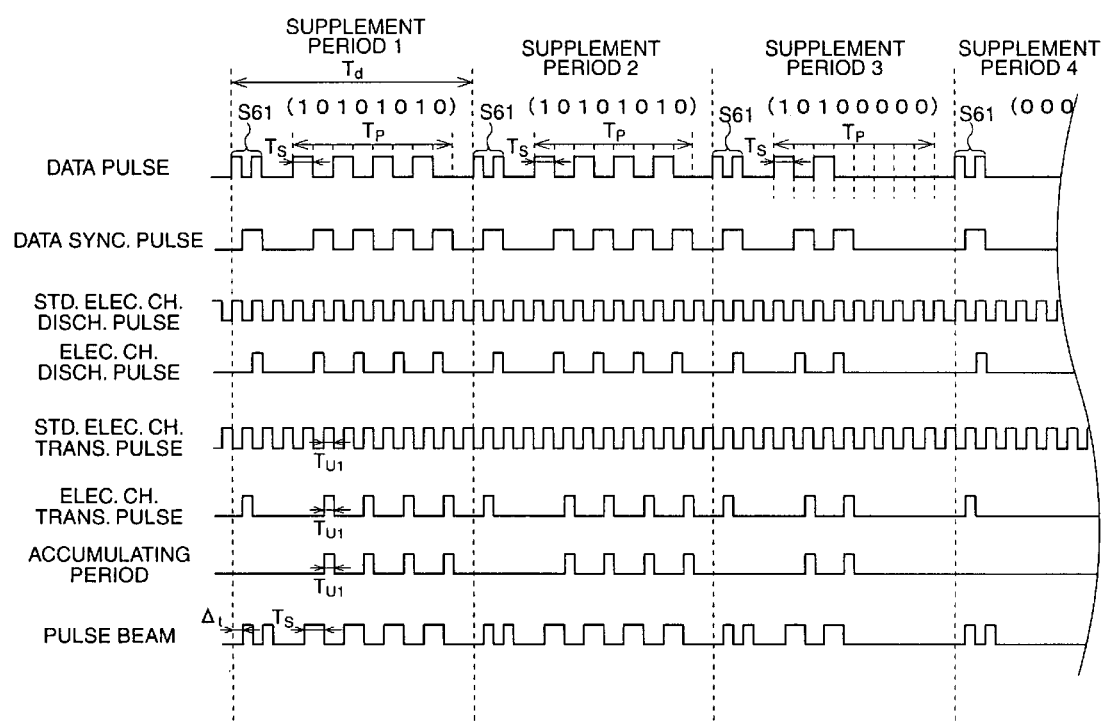
FIG. 29 is the sequence of the pulse signals output from the blocks shown in FIG. 26, during the supplement light emitting period.

With reference to FIG. 29, the sequence of the pulse beam emission and the signal charge accumulation in the supplement light emitting period is explained in the following. FIG. 29 shows the sequence of the light amount supplement operation performed in the supplement light emitting period.

In the system control circuit 35, the remaining number of the pulse beam radiations or the signal charge accumulations in the supplement light emitting period, which are required for executing the predetermined number of integrations, is calculated and the dummy data is generated for the light amount supplement operation. The generated dummy pulse is output through the data pulse generating circuit 29 as a data pulse. The sequence of the data pulses is partitioned with the partition signals S61 for each 8 bits, as well as the sequence of the data pulses representing the transmitting data, which is described with reference to FIG. 27. Further, the width of the digit period and etc. are similar to those in FIG. 27. The conversions, which are performed to the data pulse of the transmitting data at the delay circuit 45 and the CCD driving pulse converter 51, are also performed to the data pulse of the dummy data, and converted pulses are output to the light emitting control circuit 44 and the CCD drive circuit 30 as an LD driving pulse and a CCD driving pulse, respectively. Namely, when the sequence of the data pulse for the dummy data is as described in FIG. 29, the sequences of the electric charge discharging pulse and the electric charge transfer pulse are reduced to the sequences shown in FIG. 29. Consequently, the sequence of the electric charge accumulating operation in the photo-diodes also becomes as is shown in FIG. 29. Further, a timing for radiating the beam pulse is delayed Δt from that of the data pulse of the dummy data.

Each of the digit periods is adjacent to one another, therefore, if pulses consecutively exist over a certain successive digit periods, they compose a single consecutive pulse. For example, the above case is shown in FIG. 27 as the pulse corresponding to the upper three digits of the third data period, the single pulse S64 of which a pulse width is $3 \cdot T_s$. Further, as described above, in order to sense the distance information, the distance information sensing operation needs to detect the fall of the pulse beam during the signal charge accumulating period. So, when the digit of data pulse is 8 bits, the maximum number of the signal charge accumulation for one supplement period is four, which is obtained when data pulses exist in alternate digit periods of a supplement period. The sequence of data pulse in FIG. 29 illustrates the case when the accumulations are required ten times in the supplement light emitting period. In the first and second supplement periods, the pulse beams are emitted alternately four times, the maximum number of times, and corresponding signal charges of reflected pulse beams are accumulated respectively. In the third supplement period, the remaining two times emission and accumulation is carried out.

Note that, the receiving operation of the optical transmission system executed in the computer system 46 of the fourth embodiment is the same as the operation described in the second and third embodiment, the operation of which is described with reference to FIG. 21.

As described above, the same advantages as the second and third embodiments are obtained by the fourth embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 11-216449, 11-216987 and 11-217061 (all filed on Jul. 30, 1999) which are expressly incorporated herein, by reference, in their entireties.

What is claimed is:

1. A three-dimensional image capturing device, comprising:
a light source that radiates a light beam;
an image device that accumulates signal charge corresponding to a quantity of light received on said image device;
a distance information sensing processor that controls radiating of a distance measuring light beam from said light source to a measurement subject and detects distance information which relates to said measurement subject by receiving a reflected light beam from said measurement subject, said distance information sensing processor radiating said distance measuring light beam from said light source a predetermined number of times, so that signal charge is accumulated in said image device due to each radiation of said distance measuring light beam; and
a data transmitting processor that controls radiating of a data transmitting light beam from said light source, so that data is transmitted to an external device,
wherein said light source outputs the distance measuring light beam and the data transmitting light beam in a single operation,
wherein a series of said distance measuring light beams and a series of said data transmitting light beams are superposed so that said data transmitting light beams are radiated in the intervals between said distance measuring light beams and timing for radiating said data transmitting light beams is based upon the timing of said radiation of said distance measuring light beams.

2. A device according to claim 1, wherein said transmitting light beams comprise a pulse beam representing binary data having predetermined digits.

3. A device according to claim 1, wherein said distance measuring light beams and said data transmitting light beams are superposed by pulse-width modulation of said light beams, so that said light beams comprise two types of pulse beams having different widths, which represent binary data of said data and are concurrently used for detecting said distance information.

4. A device according to claim 1, wherein said distance measuring light beam is radiated before an accumulation of signal charge in said image device starts, and signal charge corresponding to said distance information of said measurement subject is accumulated during a period from a beginning of said accumulation to an end of said reflected light beam reception at said image device.

5. A device according to claim 4, wherein said data transmitting light beam is radiated prior to said distance measuring light beam.

6. A device according to claim 5, wherein said data transmitting light beam is radiated during a period, from an end of said accumulation of said signal charge in said image device to a beginning of said distance measuring light beam radiation.

7. A device according to claim 1, wherein said distance measuring light beams comprise a synchronizing signal of an optical transmission system.

8. A three-dimensional image capturing device, comprising:

a light source that radiates a light beam;

an image device that accumulates signal charge corresponding to a quantity of light received on said image device;

a distance information sensing processor that controls radiating of a distance measuring light beam from said light source to a measurement subject and detects distance information which relates to said measurement subject by receiving a reflected light beam from said measurement subject; and a data transmitting processor that controls radiating of a data transmitting light beam from said light source, so that data is transmitted to an external device, wherein said light source outputs the distance measuring light beam and the data transmitting light beam in a single operation, wherein an accumulation of said signal charge in said image device is synchronously carried out while said data transmitting light beam is output, so that said data transmitting light beam can be used as said distance measuring light beam, and said data transmitting light beams and said distance measuring light beams are superposed with each other, wherein said distance information sensing processor radiates said distance measuring light beams from said light source a predetermined number of times, so that signal charge is accumulated at said image device due to each radiation of said distance measuring light beams, and wherein said distance information sensing processor is actuated and said data transmitting light beams are radiated during a distance measuring period, in which said distance measuring light beams are repeatedly radiated said predetermined number of times, said distance measuring period comprising:

a data transmitting period, in which said distance measuring light beams and said data transmitting light beams are superposed and radiated;

a supplemental light emitting period, in which distance measuring light beams are radiated so as to supplement the number of said distance measuring light beams radiated in said data transmitting period, by a number sufficient to obtain said predetermined number of times; and a number of radiations of the distance measuring light beams is counted and compared with said predetermined number, a number of radiations during the supplemental light emitting period being determined based upon a result of said comparison.

9. A device according to claim 8, wherein a series of said data transmitting light beams represents binary data.

10. A device according to claim 8, wherein said data transmitting light beams comprise pulse modulated laser beams.

11. A device according to claim 10, wherein a data sequence transmitted by said data transmitting light beams comprises a partition signal that delimits said data sequence by predetermined binary digits of the data.

12. A device according to claim 8, wherein said image device comprises a plurality of photoelectric conversion elements that accumulates signal charge corresponding to a quantity of light received, and signal charge holding units disposed adjacent to each of said photoelectric conversion elements.

13. A device according to claim 12, wherein the accumulation of said signal charge in said image device begins with a fall of an electric charge discharging signal that discharges the charge accumulated in said photoelectric conversion elements, and ends with a fall of an electric charge transfer signal that transfers said signal charge accumulated in said photoelectric conversion elements to said signal charge holding units.

14. A device according to claim 13, wherein said electric charge transfer signal rises approximately simultaneously with the fall of said electric charge discharging signal.

15. A device according to claim 14, wherein said electric charge transfer signal is generated by combination of a standard electric charge transfer signal comprised of periodic pulse signals and a data synchronizing pulse signal generated synchronously with the fall of a pulse signal of said data sequence;

said electric charge discharging signal is generated by combination of said data synchronizing pulse signal and a standard electric charge discharging signal having a period which is the same as said standard electric charge transfer signal and from which the phase is delayed by a half period; and said data synchronizing pulse signal is synchronized with said standard electric charge discharging signal and the pulse width of said data synchronizing pulse signal is the same as one period of said standard electric charge transfer signal.

16. A device according to claim 8, wherein the accumulation of said signal charge starts when a pulse of said data transmitting light beam falls.

17. The three-dimensional image capturing device according to claim 8, further comprising a switching period between said data transmitting period and said supplemental light emitting period.

* * * * *